United States Patent [19]
Froehlich

[11] 3,770,444
[45] Nov. 6, 1973

[54] PHOTOGRAPHIC SILVER HALIDE LIGHT-SENSITIVE MATERIAL CONTAINING AZO DYES

[75] Inventor: Alfred Froehlich, Marly-le-Grand, Switzerland

[73] Assignee: Ciba-Geigy AG, Basel, Switzerland

[22] Filed: May 4, 1971

[21] Appl. No.: 140,302

[30] Foreign Application Priority Data
May 5, 1970 Switzerland.......................... 6686/70

[52] U.S. Cl.......................... 96/99, 96/73, 260/152, 260/174, 260/178, 260/181, 260/184, 260/186, 260/187
[51] Int. Cl............................................... G03c 1/10
[58] Field of Search.................................. 96/99, 73

[56] References Cited
UNITED STATES PATENTS
3,454,402  7/1969  Anderau et al.......................... 96/99
3,655,388  4/1972  Piller........................................ 96/20

Primary Examiner—J. Travis Brown
Attorney—Harry Goldsmith, Joseph G. Kolodny and Mario A. Monaco

[57] ABSTRACT

The present invention relates to photographic light-sensitive material, especially for the silver dyestuff bleaching process, containing an azo dyestuff of the formula $$A-N=N-M-X-(Y-Z)_{n-1}-Q$$

in which A represents a naphthalene residue containing 1 to 2 sulphonic acid groups or sulphonic acid amide groups, bonded in the 1 position to the azo group, in the 2 position to a possibly substituted amino group and in the 8 position to a group or in the 2 position to the azo group, in the 8 position to a possibly substituted amino group and in the 1 position to a hydroxyl group, M stands for a possibly substituted benzene residue and Y for a possibly substituted benzene, diphenyl, diphenylsulphon or di-(phenylamino)-acylic residue, X stands for $-O-$, $-S-$, $-SO-$, $-SO_2-$, $-CO-$ or $-NR-$ and Z stands for $-CO-$, $-S-$, $-SO-$, $-SO_2-$, $-CO-$, $NR_1-$, $-Cl-NR_1-$, $NR_1-CO-$, $-SO_2-NR_1$ or $-NR_1-SO_2$, in which R and $R_1$ represent a hydrogen atom or a low alkyl residue, in which $n = 1$ or 2 and Q stands for a possibly substituted heterocyclic residue, alkyl or benzene residue or a residue of the formula $$-D-N=N-E$$

in which D represents a possibly substituted benzene or naphthalene residue and E has the meaning which is stated in respect of A. These dyestuffs are magenta dyestuffs, preferably image dyestuffs in silver dyestuff bleaching material.

8 Claims, No Drawings

PHOTOGRAPHIC SILVER HALIDE LIGHT-SENSITIVE MATERIAL CONTAINING AZO DYES

The invention relates to azo dyestuffs of the formula of

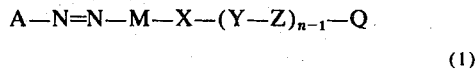

(1)

in which A represents a naphthalene residue containing 1 to 2 sulphonic acid groups or sulphonic acid amide groups, bonded in the 1-position to the azo group, in the 2-position to a possibly substituted amino group and in the 8-position to a hydroxyl group or in the 2-position to the azo group, in the 8-position to a possibly substituted amino group and in the 1-position to a hydroxyl group, M stands for a possibly substituted benzene residue and Y for a possibly substituted benzene, diphenyl, diphenylsulphon or di-(phenylamino)-acylic residue, X stands for $-O-$, $-S-$, $-SO-$, $-SO_2-$, $-CO-$ or $-NR-$ and Z stands for $-CO-$, $-S-$, $-SO-$, $-SO_2-$, $-CO-$, $NR_1-$, $-Cl-NR_1-$, $NR_1-CO-$, $-SO_2-NR_1$ or $-NR_1-SO_2$, in which R and $R_1$ represent a hydrogen atom or a low alkyl residue, in which $n = 1$ or 2 and Q stands for a possibly substituted heterocyclic residue, alkyl or benzene residue or a residue of the formula $$-D-N=N-E$$

(1a)

in which D represents a possibly substituted benzene or naphthalene residue and E has the meaning which is stated in respect of A.

Preferentially, these azo dyestuffs comply with formula

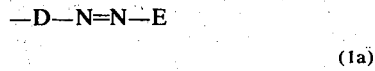

(2)

in which $A_1$ and $E_1$ each stands for a possibly N-acylated 1-hydroxy-8-aminonaphthalene-3,5- or -3,6-disulphonic acid residue combined with the azo group in 1 position or a 2-amino-8-hydroxynaphthalene-6-sulphonic acid residue combined with the azo group in the 1 position which possibly possesses a possibly further substituted residual alkyl or benzene on the nitrogen atom, $M_1$ stands for a residual benzene possibly substituted with halogen atoms, low alkyl or alkoxy groups, sulphonic acid, sulphonic acid amide, carboxylic acid or carboxylic acid amide groups, $G_1$ stands for a possibly substituted residual alkyl or benzene and $D_1$ stands for a residual benzene possibly substituted with halogen atoms, low alkyl or alkoxy groups, sulphonic acid, sulphonic acid amide, carboxylic acid or carboxylic acid amide groups or a residual naphthalene possibly substituted with 1 or 2 sulphonic acid groups, m and n are each either 1 or 2 and X, Y and Z have the meaning as stated.

The halogen atoms listed as substituents of $M_1$ and $D_1$ may be fluorine, iodine or, above all, bromine or chlorine. Inasfar as $M_1$ or $D_1$ contain low alkyl or akoxy groups as substitutents, these contain as a rule 1 to 4, but preferentially one carbon atom.

Inasfar as Q in Formula (1) represents a heterocyclic residue, these will preferentially by pyridine, thiophene or furane residues. The residual alkyls Q or $G_1$ contain 1 to 18 carbon atoms as a rule. Inasfar as the residual Q represents a benzene or a heterocyclic residue, halogenes, alkoxy, alkyl, aryl, the residue of an aromatic carboxylic acid, e.g. of one of formulas

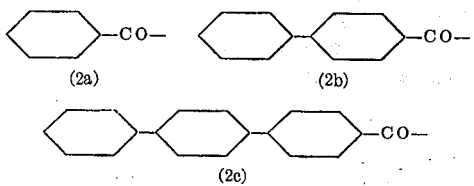

nitro, sulphonic acid, sulphonic acid amide, carboxyl or carboxylic acid amide may be considered.

Accordingly, the azo dyestuffs of formulas (1) and (2) thus represent either mono or diazo dyestuffs. Inasfar as $m = 1$ in formula (2), they will be mono dyestuffs and if $m = 2$, they will be diazo dyestuffs. The latter may be symmetrical as well as asymmetrical.

Preferentially, the diazo dyestuffs comply with formula

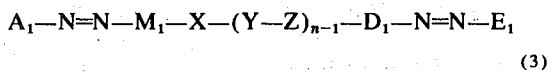

(3)

in which X, Y, Z, n, $A_1$, $M_1$, $D_1$ and $E_1$ have the meaning as stated.

Diazo dyestuffs of the formula

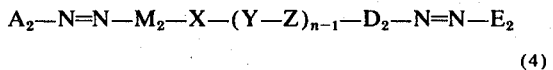

(4)

are of special interest. In same, $A_2$ and $E_2$ each stand for a possibly N-acylated residual 1-hydroxy-8-aminonaphthalene-3,5- or -3,6-disulphonic acid or a 2-amino-8-hydroxy-naphthalene-6-sulphonic acid, which possibly have a possibly further substituted benzene residue as substituent on the nitrogen atom, $M_2$ stands for a residual benzene possibly substituted with chlorine, methyl, methoxy, sulphonic acid or carboxylic acid groups and D stands for a residual benzen possibly substituted with chlorine, methyl, methoxy, sulphonic acid or carboxylic acid groups or for a residual naphthalene disulphonic acid and X, Y, Z and $n$ have the meaning as stated.

Amongst these azo dyestuffs, those of formula

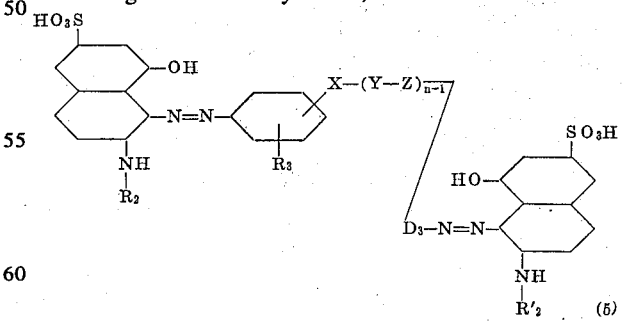

(5)

must be specially mentioned. In same, $R_2$ and $R'_2$ each stand for a hydrogen atom or for a residual benzene possibly substituted with at least one low alkyl, alkoxy or alkyl-carbonyl group, a phenoxy, dialkylaminocarbonyl, dialkylaminosulphonyl, trifluormethyl, sulphonic acid or carboxyl group or a halogen atom, $R_3$ stands for a hydrogen or a chlorine atom or a sulphonic acid group and $D_3$ stands for a residual benzene possibly substituted with chlorine or sulphonic acid groups which is combined with the other part of the dyestuff molecule in the 3 or 4 position to the azo group, or a 2,6-naphthalene-4,8-disulphonic acid residue, the residual benzene with which $R_3$ is combined being combined with X in the 3 or 4 position and X, Y, Z and n having the meaning as stated.

Diazo dyestuffs with good suitability comply with formula:

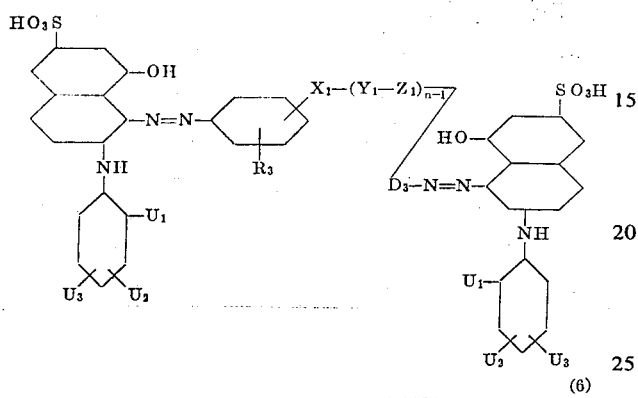

(6)

in which $U_1$ stands for a hydrogen atom, a methyl or methoxy group, $U_2$ for a hydrogen or halogen atom, a methyl, methoxy or phenoxy group, $U_3$ for a chlorine, bromine or fluorene atom, a methyl, methoxy, acetyle, trifluormethyl, sulphomethyl, sulphonic acid, carboxylic acid, carboxylic acid-dimethylamide or sulphonic acid-diethylamide group, $Y_1$ for a benzene, diphenyl, diphenylsulphonic or possibly sulphonic acid group containing residual benzene-dicarboxylic acid-di-(amidophenyl), $X_1$ stands for —O—, —S—, —SO$_2$—, CO— or —NH— and $Z_1$ stands for —O—. —S—, —CO—, —NH—, —NH—CO— or —CO—NH— and $R_3$, $D_3$ and n have the meaning as stated.

Preferred from amongst these are azo dyestuffs of formula:

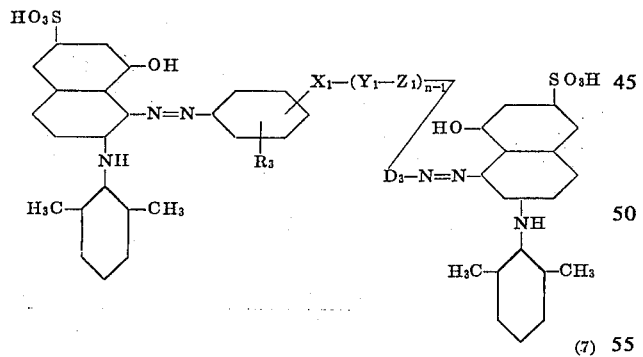

(7)

and above all, those of formula

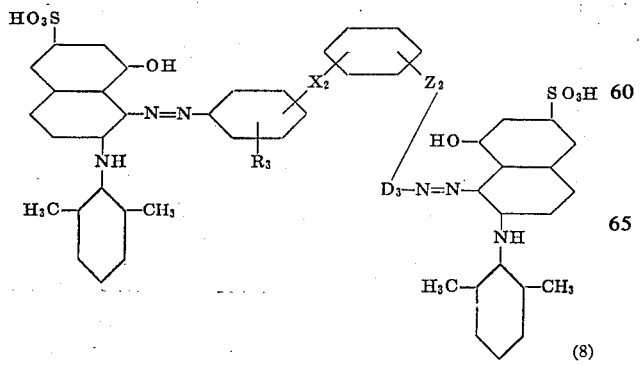

(8)

in which $X_2$ stands for —O—, —S—, —CO— or —SO$_2$— and $Z_2$ for —O— or —CO—NH— and $R_3$, $D_3$, n, $X_1$, $Y_1$ and $Z_1$ have the meaning as stated.

Special interest is further claimed by diazo dyestuffs with the follow formulas:

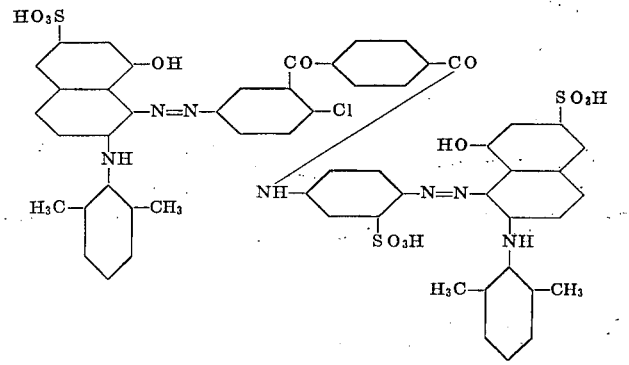

(9)

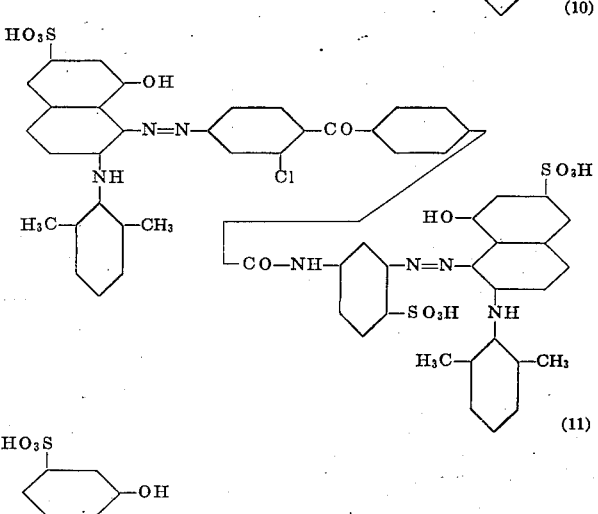

(10)

(11)

(12)

Monoazo dyestuffs preferentially comply with formula $$A_1-N=N-M_1-X-(Y-Z)_{n-1}-G_1 \quad (13)$$

in which X, Y, Z, $n$, $A_1$, $M_1$ and $G_1$ have the meaning as stated.

In this connection, monoazo dyestuffs of formula $$A_2-N=N-M_2-X-Y-Z-G_2 \quad (14)$$

are of special interest.

In same, $G_2$ stands for a residual benzene possibly substituted with halogen, low alkyl or alkoxy groups or nitro groups or a residual alkyl with 1 to 17 carbon atoms and X, Y, Z, $A_2$ and $M_2$ have the meaning as stated.

Specially suitable monoazo dyestuffs comply with formula

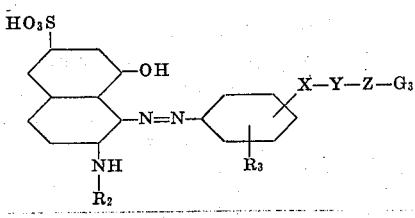

(15)

in which $G_3$ represents a residual benzene or a residual alkyl with 1 to 12 carbon atoms and X, Y, Z, $R_2$ and $R_3$ have the meaning as stated, the residual benzene to which $R_3$ is bound, being combined with X in the 3 or 4 position to the azo group.

Special mention must be made of monoazo dyestuffs of formula

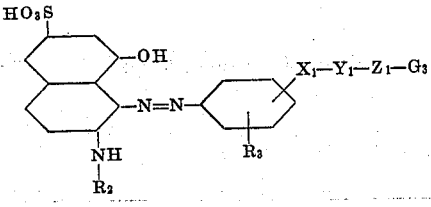

(16)

and particularly of those of formula

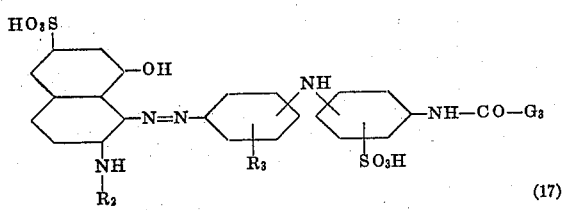

(17)

in which $X_1$, $Y_1$, $R_2$, $R_3$ and $G_3$ have the meaning as stated.

In the case of residues A and E in formula (1), these may be, for instance, residues of the
1-hydroxy-7-amino-naphthalene-3,6-disulphonic acid,
1-hydroxy-8-amino-naphthalene-5,7-disulphonic acid, or
1-hydroxy-8-amino-naphthalene-3-sulphonic acid and above all of the 2-amino-8-hydroxy-naphthalene-6-sulphonic acid,
1-hydroxy-8-amino-naphthalene-3,6-disulphonic acid or
1-hydroxy-8-amino-naphthalene-4,6-disulphonic acid and/or of residues of amides of these acids which are possibly further substituted at the amino group.

In the case of the sulphonic acid amides of the 2-amino-8-hydroxy-naphthalene-6-sulphonic acid, these are, e.g. the
2-amino-naphthol-6-sulphonic acid amide,
2-amino-8-naphthol-6-sulphonic acid-hexylamide,
2-amino-8-naphthol-6-sulphonic acid-β-hydroxyethylamide or
2-amino-8-naphthol-6-sulphonic acid diethylamide.

The amino group of this acid or of its amides may be substituted by an aromatic residue.

Examples of such substituents are the following:
phenyl, 2-6-dimethylphenyl, 2- or 3- or 4-chlorophenyl, 2,3- or 3,4- or 3,5-dichlorophenyl, 2- or 4-fluorophenyl, 2-methyl-4- or 5-chlorophenyl, 3-trifluoromethylphenyl, 2,6-dimethoxydiphenyl, 2- or 4-phenylsulphonic acid, 2-methylphenyl-4-sulphonic acid, 4-chlorophenyl-3-sulphonic acid, 2- or 4-acetylphenyl, 3- or 4-sulphomethylphenyl, 4-bromophenyl, 4-dimethylaminocarboxylphenyl, 4-phenylcarboxylic acid, 4-phenylsulphonic acid-diethylamide, 4-chloro-3-methoxyphenyl, 4-phenoxyphenyl-3-sulphonic acid, 4-methoxyphenyl-3-sulphonic acid. Further, alkyl residues, e.g. with 1 to 4 carbon atoms must be considered.

The sulphonic acid amides of the 1-hydroxy-8-amino-naphthalene-3,6-disulphonic acid are for instance, the 1-hydroxy-8-aminonaphthalene-3,6-disulphonic acid-dimethylamide.s. The amino group of this acid or of its amides can be substituted by acyl groups. Examples of same are the following:

Benzoyl, caproyl, phenylacetyl, 4-chlorobenzoyl, 4-bromobenzoyl, nicotinoyl, 2,4-dichlorobenzoyl, 4-tert. isobutyl-benzoyl, 4-methoxybenzoyl, 4-nitrobenzoyl-, 2-chlorobenzoyl, 3-trifluoromethylbenzoyl, 3.5-dinitrobenzoyl, 3-aminosulphonyl, -benzoyl, 4-aminosulphonylbenzoyl, benzoyl-3-sulphonic acid, 4-acetyl-aminobenzoyl, 4-succinylaminobenzoyl, 3-nitrobenzoyl, 2-chloro-4-nitrobenzoyl, 4-chloro-3-nitrobenzoyl, 4-benzoyl-benzoyl-3,4-dichlorobenzoyl, 3-sulphonamido-4-chlorobenzoyl, 2-chloro-3-nitrobenzoyl, 5- or 4-methylsulphonylbenzoyl, 3-chlorobenzoyl, 4-chlorobenzoyl-3-sulphonic acid, 3.4-diaminobenzoyl, 4-chlorobenzoyl-3-sulphonic acid-methylamide, 4-cyanobenzoyl, 4-acetylbenzoyl, 4-benzoyl-benzoyl benzoyl-4-sulphonic acid-methylamide, 4-phenyl-sulphonylbenzoyl, 4-benzoylaminobenzoyl, 4-benzoylaminobenzoyl-4'-carboxylic acid.

The sulphonic acid amides of the 1-hydroxy-8-amino-naphthalene-4,6-disulphonic acid are, e.g., the 1-hydroxy-8-amino-naphthalene-4,6-disulphonic acid-dimethylamides. The amino group of this acid or of its amides can be substituted by the acyl groups as stated for the 1-hydroxy-8-amino-naphthalene-3,6-disulphonic acid.

Other sulphonic acids or sulphonic acid amides to be considered for A or E can also contain acyl residues of the stated type.

According to the production method of dyestuffs of formula (1), the residues M and D are for instance derived from acid chlorides, nitroaminobenzenes and/or naphthalenes, chloronitrobenzene-sulphonic acids or chloronitrobenzoic acids, e.g. the following acid chlorides:

m- or p-nitrobenzoylchloride
2-chloro-4-nitrobenzoylchloride,
2-chloro-5-nitrobenzoylchloride,
4-chloro-2-nitrobenzoylchloride,
4-chloro-3-nitrobenzoylchloride,
5-chloro-2-nitrobenzoylchloride,
5-nitrobenzene-sulphochloride,
2-bromo-4-nitrobenzoic acid chloride,
2-chloro-5-nitrobenzene-sulphochloride,
3-methoxy-4-nitrobenzoylchloride, Nitroamino-benzenes and/or naphthalenes:
4-nitraniline,
4-nitraniline-3-sulphonic acid,
2-nitraniline-6-aminotoluene-4-sulphonic acid,
3-amino-2-nitroanisol-4-sulphonic acid,
3-chloro-4-nitraniline,
1,4-phenylenediamine-3-sulphonic acid,
1,3-phenylenediamine-6-sulphonic acid
5-amino-2-nitrobenzoic acid,
2-amino-4-nitrobenzoic acid,
2-amino-6-nitronaphthalene-4,8-disulphonic acid,
2-amino-7-nitronaphthalene-5-sulphonic acid, Chloro-nitro-benzene-sulphonic acids or chloronitrobenzoic acids:
2-chloro-4-nitrobenzene-sulphonic acid,
2-chloro-4-nitrobenzoic acid,
2-methoxy-4-nitrobenzoic acid.

The residue Y can be derived, for example, from bivalent phenols and/or thiophenols or diamines, e.g.:
hydroquinone,
4,4'-dihydroxydiphenyl,
4,4'-dihydroxy diphenylsulphone,
4,4'-diamino-methyldiphenylamine,
benzidine,
hydroquinone-to-(4-amino-2-trifluoromethylphenyl) ether,
1,3-dimercaptobenzene.

G is an aliphatic, aromatic or heterocyclic residue which derives from a carboxylic or sulphonic acid. Such acids are for example:
Caproic acid,
caprilic acid,
lauric acid,
stearic acid,
benzoic acids which are substituted with one or more nitro, alkyl, alkoxy, alkylcarbonyl, acylamino groups or with halogen atoms,
diphenyl-4-carboxylic acid,
4-benzoylbenzoic acid,
4-phenyl-(4'-benzoylbenzoic acid),
phthalic acid,
phenylacetic acid,
thiophen-2-carboxylic acid,
pyridine-2, -3- or -4-carboxylic acid.

But G can also be combined with the A—N=N—M—residue via an amino group or an oxygen atom and such a bond will for instance comply with formula $$A-N=N-M-V-G \quad (17a)$$

V representing a secondary or tertiary amino group or an oxygen atom.

Dyestuffs of formulas (1) to (19), however, can be available not only in the form of their free acids, i.e. with $HO_3S$ groups and/or HOOC groups, but also as salts. According to the conditions of precipitation, in particular of the selected pH value or of the cation of the salt used for precipitation; various salts can be formed, e.g., $-SO_3Na$, $-SO_3K$, $(-SO_3)_2Ca$, $-COONa$, $-COOH$, $COONH_4$. Preferentially these are thus salts of the alkaline earth group or particularly of the alkaline group.

Azo dyestuffs of formula (1) can be produced in accordance with methods which are known. According to whether it is a question of symmetrical or assymetrical diazo dyestuffs or of mono-azo dyestuffs, procedures vary.

One production process with particular reference to symmetrical azo dyestuffs of formula (1), in which Q represents a residue of the formula $-D-N=N-E$, is, for example, characterised by the fact that an aminonaphthol of formula $$A-H \quad (18a)$$

and/or of formula $$E-H \quad (18b)$$

is made to react with a bi-diazo salt of formula $$[N_2^+-M-X-(Y-Z)_{n-1}-D-N_2^+][(2/q)\ An^{q-}] \quad (19)$$

in which $An^{q+}$ stands for an anion of the value $q$ and $q$ stands for 1 or 2, A, M, X, Y, Z, D, E and $n$ having the meaning as stated.

A particular production process for asymmetrical azo dyestuffs of formula (1) in which Q represents a residue of the formula $-D-N=N-E$ and A possesses a substituted amino group in the 2- or 8-position, is, for instance, characterised by the fact that an aminonaphthol of formula $$E-H \quad (18b)$$

is made to react with a diazo salt of formula $$q\ [A-N=N-M-X-(Y-Z)_{n-1}-D-N_2^+][An^{q-}] \quad (20)$$

in which $An^{q+}$ represents a $q$-valent anion and $q$ stands for 1 or 2, A, M, X, Y, Z, D, E and $n$ having the meaning as stated, with the limitation given above in respect of A.

A production process for azo dyestuffs of formula (1) in which Q represents a possibly substituted heterocyclic residue, alkyl or benzene residue, is, for instance, characterised by the fact that an aminonaphthol of formula $$q[N_2^+-M-X-(Y-Z)_{n-1}-Q][An^{q-}]$$

(21)

is being made to react, $An^{q-}$ in same representing a $q$-valent anion and $q$ standing for 1 or 2, A, M, X, Y, Z, Q and $n$ retaining their stated meaning with the limitation mentioned above in respect of Q.

A further production process for azo dyestuffs of formula (1) in which Q represents a possibly substituted heterocyclic residue, alkyl or benzene residue, Z stands for $-NR_1-$ and X inasfar as $n = 1$ stands for $-NR-$ and in which R and $R_1$ have the stated meaning, is characterised by the fact that a compound of the formula $$A-N=N-M-X-(Y-Z)_{n-1}-H$$

(22)

is made to react with an acid halogenide and/or dicarboxylic acid anhydride of formula Hal—CO—Q bzw.

(23a)

(23b)

in which A, M, X, Y, Z, Q or n have the stated meaning with the limitation stated above in respect of Q, X and Z.

An appropriate manner of obtaining, above all, symmetrical diazo dyestuffs in accordance with the invention, is for instance the following: Production of diamines of formula $$H_2N-M-X-(Y-Z)_{n-1}-NH_2$$

(24)

in which M, X, Y, Z and $n$ have the stated meaning.

These diamines are to be coupled to the relative aminophtholsulphonic acid.

Diamines of formula (24) are partly known products. They can be easily produced, e.g., by a reaction between 2-chloro-5-nitrobenzene sulphonic acid with the relative polyvalent phenols and/or with dimercaptobenzenes.

Other diamines can, e.g., be produced in the manner shown in the following example:

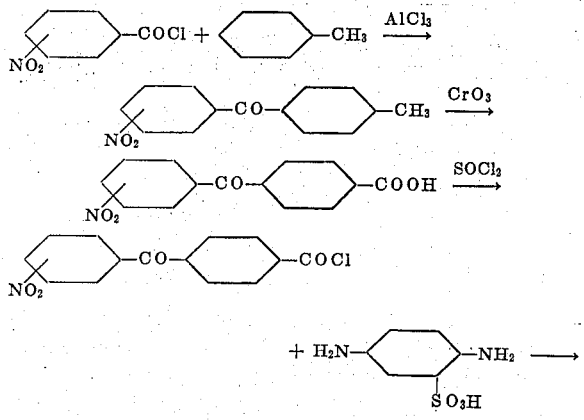

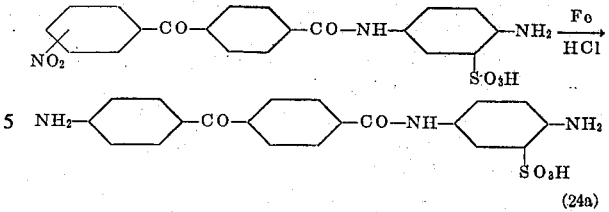

(24a)

Another diamine production method according to formula (24) results from the following scheme of formulas:

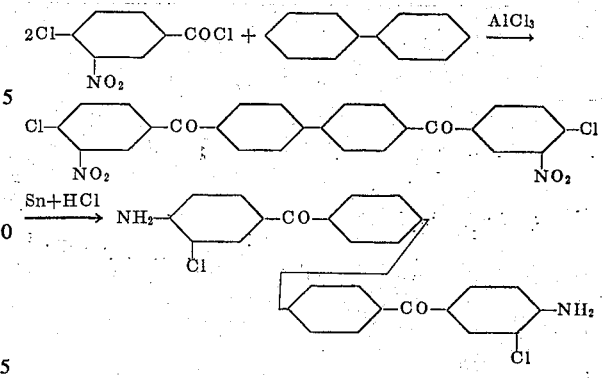

(24b)

Further, certain diamines of formula (24) can be produced in accordance with the following scheme of formulas:

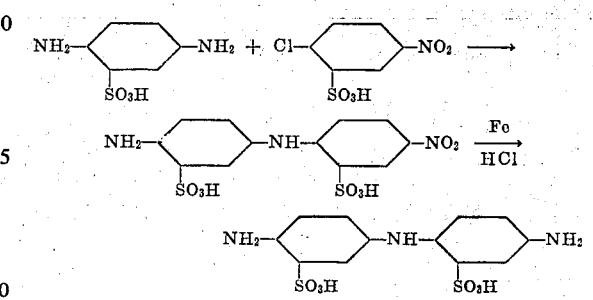

(24c)

Asymmetrical diazo dyestuffs are appropriately obtained according to the stated procedures by coupling a diazotised nitroamine of formula $$O_2N-M-X-(Y-Z)_{n-1}-D-NH_2$$

(25)

in which M, X, Y, Z, D and N have the stated meaning, with a relative sulphonic acid of formula

A—H (18a)

in which A has the stated meaning and is substituted at the amino group.

Subsequently, the nitro group is reduced and coupled with an amininaphthol of formula

H—E (18b)

For example, mono-azo dyestuffs are obtained by diazotising an amine of formula $$H_2N-M-X-(Y-Z)_{n-1}-G_1$$

(26)

in which M, X, Y, Z, $G_1$ and n have the stated meaning, coupling the diazo compound with aminonaphthol of formula (18a) and possibly further reactions on $G_1$, such as reduction and subsequent acylising of a possibly available nitro group on $G_1$.

On the other hand, it is also possible to acylise first a diamine of formula $$H_2N—M_s—X—Y—NH_2 \quad (27)$$

in which X and Y have the stated meaning and $M_s$ stands for a residual benzene which carries a sulphonic acid group in the ortho-position to the amino group, into a compound of formula

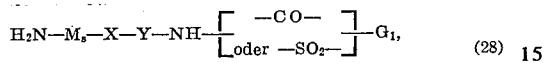
(28)

in which $M_s$, X, Y and $G_1$ have the stated meaning and to couple same subsequently, after diazotising the second amino group, with an aminonaphthol of formula (18a) and/or (18b).

The dyestuffs of formula (1) can be applied for various purposes, e.g. in photographic materials, and, in this respect and with particular advantage, as image dyes for the silver colour bleaching process. Accordingly and in the usual, in itself already known manner, valuable photographic materials can be produced which on one coating carrier contain at least one layer with a dyestuff of formula (1).

In particular, these dyestuffs can be present in a multi-layer material, one coating layer of which contains a layer dyed with a greenish-blue dyestuff, selectively red-sensitive, above it a layer dyed purple with a dyestuff of formula (1), selectively green-sensitive and finally a layer dyed with a yellow dyestuff, which is sensitive to blue. Dyestuffs of formula (1) can also be deposited, however, in an auxiliary layer or, particularly, in a layer adjacent to the light-sensitive layer.

Dyestuffs of formula (1) are diffusion-proof, have a good solubility in water, are resistant to calcium ions and are good to highly fast to light. Dyestuffs in accordance with the invention also offer manifold facilities to vary spectral characteristics and excel by their extraordinarily pure colour shades and high colour strength.

The extremely favourable course of the spectral absorption graph permits the combination of these purple dyestuffs with one matching yellow and bluish-green dyestuff each. At the same time, grey shades which appear to be neutral to the eye, are obtained throughout the entire density range.

The dyestuffs are also suitable for depositing in layers which are immediately adjacent to light-sensitive layers or in any layer of the photographic material, for instance even in the back layer. The dyestuffs can also be used advantageously as filter and antihalo dyestuffs. They are even suitable for nuancing of the support, e.g., in barytting.

EMBODIMENTS

Example 1

1.1  2'-chloro-5'-nitrobenzoyl-4-methylbenzene

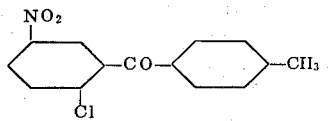
(101a)

150 grs of 2-chloro-5-nitrobenzoylchloride are dissolved in 300 ml of toluene and are mixed in portions with 100 grs of aluminum chloride in such a manner that the toluene keeps on boiling. Subsequently, heating is continued in a steam bath for a further 30 minutes, the solution is then mixed with 1 kg of ice and 100 ml of 37 % HCl and the excess toluene is distilled off with steam. The residue is crystallised from 6 litres of ethanol.

Yield: 170 grs

Melting point : 97.9° C, white crystals.

1.2  2'-chloro-5'-nitrobenzoylbenzene-4-carboxylic acid chloride

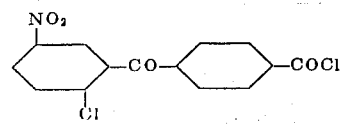
(101b)

100 grs of 2-chloro-5-nitrobenzoyl-4'-methylbenzene are heated with 700 grs of glacial acetic acid to 80° C and 82.5 grs of chrome trioxide are put in in such a manner that the temperature remains at 80° to 90° C without further heat being provided. Subsequently, the temperature is raised to 110° C and is held there for 15 minutes. The mixture is then left to cool down to 8° C, the precipitated crystals are suctioned off, 100 ml of glacial acetic acid are used for washing, this being continued with water until same discharges colourless. White crystals are obtained which are pressed off well and are re-crystallised from 700 cc of glacial acetic acid. 48 grs of the 2'-chloro-5'-nitrobenzoyl-benzene-4-carboxylic acid thus obtained are boiled for 12 hours with 150 ml of thionyl chloride, the excess thionyl chloride is suctioned off into a vacuum on the steam bath, the residue is mixed with 50 ml of toluene and 5 grs of active carbon, suctioned off hot, the filtrate is mixed with 100 ml of petrol ether, cooled to 0° C, the precipitated crystals are filtered off and are washed with petrol ether.

Yield : 48 grs

Melting point : 96° C 1.3

1-(2'-chloro-5'-nitrobenzoylbenzene-)-4-carboxylic acid-4''-amino-phenylamide-3''-sulphonic acid

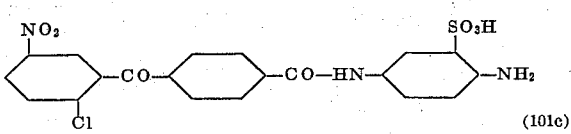
(101c)

4.2 grs of p-phenylene-diamine sulphonic acid are dissolved in 70 ml of water at pH 8.5 and 80° C and are mixed with a solution of 6.4 grs of the cloride from 1.2 in 50 ml of acetone, this taking place slowly within a period of 30 minutes, the temperature being kept to 80° C and the pH value to 8.5 by letting 1-n-sodium carbonate solution drip in. The pH value is then brought to 0.5 by adding 37 % HCl, the solution is then suctioned off and the residue is washed three times on the filter with 100 ml of water and dried in the vacuum at 80° C. After recrystalising from 50 ml of 90 percent pyridine, 7 grs of crystals of the pyridine salt of the compound of formula (101c) is obtained.

Melting point 249° C.

1.4 1-(2'-chloro-5'-aminobenzoylbenzene)-4-carboxylic acid-4''-aminophenylamide-3''-sulphonic acid

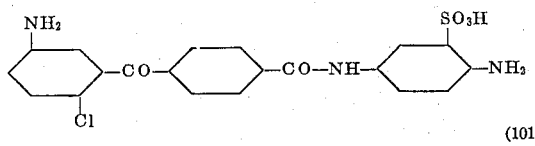

(101d)

20 grs of crystallised iron-II sulphate are dissolved in 40 ml of water, mixed with 40 grs of 24 percent ammonia, stirred for 5 minutes on the steam bath, mixed with 5.4 grs of the substance of formula (101c), heated for 15 minutes on the steam bath whilst stirring, suctioned off hot and washed three times with 20 ml of water in each case. The filtrate is brought to pH 0.5 with 37 % HCl, suctioned off and washed with water. The filter residue dried in a vacuum at 80° C is dissolved in 20 ml of dimethylformamide, suctioned off and the filtrate is mixed with 50 ml of glacial acetic acid. After cooling the precipitate to 20° C, it is suctioned off, washed with 50 ml of glacial acetic acid and dried in a vacuum at 80° C. After re-crystallising from 30 ml of formic acid, 3 grs of crystals of the salt of the compound of formula (101d) are obtained.

Melting point above 300° C.

1.5 Dyestuff of formula (101)

1 g of the product of formula (101d) is dissolved in 3 ml of 96 percent sulphuric acid and mixed at 5° C with 0.15 grs of sodium nitrite. Stirring is carried on for 2 hours at between 0° and 5° C. This is then mixed with 20 grs of ice, the temperature not being let to rise above 5° C. Subsequently, it is mixed with 50 ml of water. By adding crystallised sodium acetate, it is set to Congo neutral and the excess nitrous acid is removed with sulphamic acid. Then, a solution of 1.6 grs of 2-(2',6'-dimethylphenyl)-amino-8-naphthol-6-sulphonic acid sodium in 20 ml of water is added all at once. The coupling into the diazo dyestuff occurs immediately. Stirring is carried on for 1 hour at room temperature and the mixture is then slowly heated to 80°C. It is then mixed with 10 grs of sodium chloride, cooled to 10°C, suctioned off and washed with 5 percent sodium chloride solution afterwards.

1.2 grs of dyestuff of formula (101) as per Table I will be obtained.

If the equivalent quantity of 1-(2-methoxy-5-aminobenzoyl-benzene)-4-carboxylic acid-4''-aminophenylamide-J''-sulphonic acid is used instead of the chlorine compound of formula (101d), a similar dyestuff will be obtained.

Example 2

2.1 2'-chloro-4'-nitrobenzoyl-4-methylbenzene

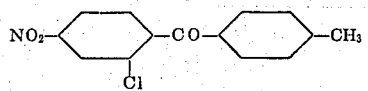

(102a)

is produced analogously to the details given in 1.1.
Melting point 111.2° C.

2.2 2'-chloro-4'-nitrobenzoylbenzene-4-carboxylic acid chloride

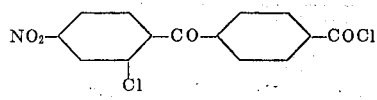

(102b)

is produced analogously to the details given in 1.4.
Melting point 81.0° C.

2.3 181-(2'-chloro-4'-nitrobenzoylbenzene)-4-carboxylic acid-4''- aminophenylamide-3''-sulphonic acid

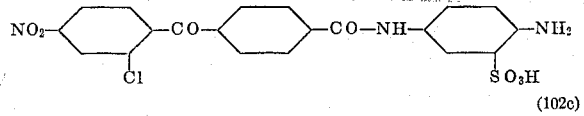

(102c)

12.2 grs of p-phenylenediamine sulphonic acid are dissolved in 200 ml of water at 80° C and a pH value of 8.5 and whilst stirring, one lets a solution of 19 grs of acid chloride of formula (102b) drip in within 1 hour at 80° C, the pH value being kept at 8.5 by the addition of 1-n-sodium carbonate solution. Subsequently, stirring is continued for one-half hour at 80° C, then one suctions off hot and after-washes with 400 ml of water. The filter cake is well pressed and is crystallised without drying from 200 ml of pyridine. After another re-crystallisation from dimethylformamide, 21 grs of yellow-coloured crystals of the sodium salt of the compound of formula (102c) are obtained.

Melting point above 300° C.

2.4 181-(2'-chloro-4'-aminobenzoylbenzene)-4-carboxylic acid-4''-aminophenylamide-3''-sulphonic acid

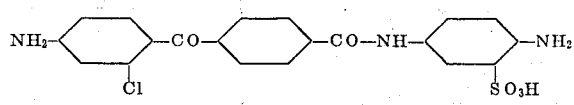

(102d)

is produced analogously to the details given in 1.4.
Melting point above 300° C.

2.5 The production of the dyestuff of formula (102) of Table I occurs analogously to the details given in 1.5.

Example 3

3.1 4'-nitrobenzoyl-4-methylbenzene

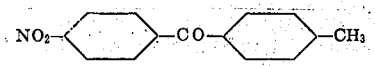

(103a)

is produced analogously to the details given in 1.1.
Melting point : 121° C.

3.20 4'-nitrobenzoyl-4-benzoylchloride

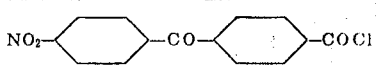

(103b)

is produced analogously to the details given in 1.2
Melting point: 130° C.

3.3 1-(4'-nitrobenzoylbenzene)-4-carboxylic acid-3''-aminophenylamide-4''-sulphonic acid

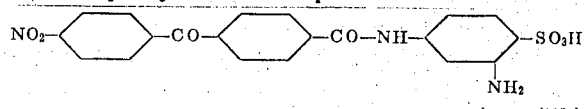

(103c)

28 grs of 1,3-phenylenediamine sulphonic acid are dissolved in 300 ml of water at 80° C and pH 8.5. Within 1 hour, one lets a solution of 36 grs of the chloride of formula (103b) drip in at between 75 and 80° C, the pH value being kept at 8.5 by the addition of 1-n-sodium carbonate solution. The conversion product precipitates. When all the chloride has been put in, the mixture is heated for another one-half hour to 80° C, suctioned off, washed with a little water and dried in a vacuum at 80° C. After re-crystallising from 300 ml of dimethylformamide, 24 grs of yellowish crystals of the sodium salt of the compound of formula (103c) with a melting point above 300° C are obtained.

3.4 1-(4'-aminobenzoylbenzene)-4-carboxylic acid-3''-aminophenylamide-4''-sulphonic acid

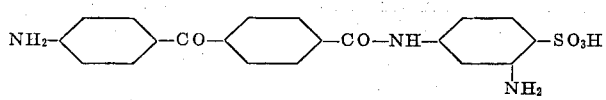

(103d)

15 grs of the product from 3.3 are dissolved in 1 litre of water, at 80° C, with 5 ml of 10-n-NaOH and are then added within half an hour to a mixture of 15 grs of iron, 25 cc of 37 % HCl and 25 ml of water which has been heated on the steam bath for 6 hours, being stirred all the time. Stirring is continued on the steam bath for 3 hours, the pH is set to 9 by adding sodium carbonate, it is then suctiond off hot and the residue is washed four times, each time with 50 ml of hot water. It is then cooled to between 2° and 3° C, suctioned off and the residue is washed out with 20 ml of iced water and dried in a vacuum at 80° C. It is then dissolved in 70 ml of pyridine and 120 ml of water, boiled with 2 grs of carbon, suctioned off hot, the mother lye is then mixed with 400 ml of ethanol, cooled to 3° C, suctioned off and washed with ethanol.

Melting point: above 300° C

Yield : 7 grs of the product of formula (103d)

3.5 Production of the dyestuff of formula (103)

1 g of the production of formula (103d) is dissolved in ml of 96 % sulphuric acid at 40° C, cooled to 5° C and mixed with 0.4 grs of sodium nitrite. It is stirred at 0° to 5° C for 2 hours. 20 grs of ice are added, so that the temperature does not rise above 5° C, 50 ml of water are used for dilution, the mixture is then made Congo-neutral by the addition of sodium acetate and the excess ntrous acid is removed with sulfamic acid. For this purpose, a solution of 2.6 grs of 2-(2', 6'-dimethylphenyl)-amino-8-hydroxy-naphthalene-6-sulphonic acid sodium is produced with 26 ml of water. The coupling into the diazo dyestuff occurs at once. Stirring is carried on for one hour at room temperature and the mixture is then heated to 80° C within half an hour, is mixed with 8 grs of sodium chloride and cooled to 10° C. It is then suctioned off and washed with 50 ml of 5 percent sodium chloride solution. 1.2 grms of dyestuff of formula (103) as per Table I are obtained.

Example 4

4.1 Hydroquinone-4',4''-di(nitrophenyl ether)-2',2'-disulphonic acid

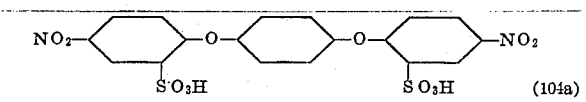

(104a)

28 grs of 86 percent 1-chloro-4-nitrobenzene-2-sulphonic acid are dissolved in 200 ml of water and 5.5 grs of hydroquinone as well as 4 grs of sodium hydroxyde are added. The mixture is heated for 6 hours whilst being stirred on the steam bath. It is set to pH 0.5 with 40 ml of 37% HCl, cooled to 10° C, suctioned off and washed to neutral with iced water.

Yield : 19 grs of the di-sodium salt of the compound of formula (104a).

4.2 Hydroquinone-4,4'-di-(aminophenyl ether)-2',2''-disulphonic acid

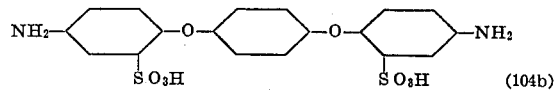

(104b)

50 grs of iron, 100 ml of water and 50 ml of 37 % HCl are heated for 6 hours whilst being stirred on the steam bath and are then mixed with 56 grs of the production of formula (104a), dissolved in 300 ml of water at the temperature of 80° C. Stirring is continued at 95° C for 2 hours, the mixture is then set to pH 9 by the addition of sodium carbonate, is suctioned off hot and the residue is washed twice, each time with 50 ml of water. The filtrate is set to pH 0.5 with 37 % HCl, is cooled to 10° C, the precipitate is suctioned off and is washed twice, eachtime with 50 ml of water.

Yield 26 grs of the compound of formula (104b).

4.3 Production of the dyestuff of formula (104)

2.3 grs of the compound of formula (104b) are dissolved in 20 ml of water and 7 ml of 2-n-sodium carbonate solution, mixed with 3 ml of 4-n-sodium nitrite solution and stirred into a mixture of 30 grs of ice and 15 cc of 37 % HCl. This diazo solution is added all at once to a solution of 4 grs of 2-(2', 6'-dimethyl-phenyl)-amino-8-hydroxynaphthalene-6-sulphonic acid sodium in 30 ml of water and is set at pH 3 by the addition of sodium acetate. It is stirred for one hour at room temperature and the temperature is then raised to 80° C within 1 hour. It is then mixed with 5 grs of sodium chloride and cooled to 10° C. The precipated dyestuff is suctioned off and is washed with 30 ml of 10 % sodium chloride solution. The dyestuff is then dissolved in 50 ml of water at 80° C, filtered, the filtrate is mixed with 8 grs of sodium chloride and cooled to 10° C. The precipitated dyestuff is suctioned off and is then washed with 20 ml of 10 percent sodium chloride solution and subsequently with 10 ml of 5 percent sodium chloride solution.

Yield 1.1 grs of dyestuff of formula (104) as per Table I.

Example 5

Production of the dyestuff of formula (105)

2.3 grs of the compound of formula (104b) are dissolved in 200 ml of water and 7 ml of 2-n-sodium carbonate solution, are mixed with 3 ml of 4 -n-sodium nitrite solution and stirred into a mixture of 30 grs of ice and 15 ml of 37 % HCl. This diazo solution is then added to a solution of 6 grs of 1-benzoylamino-8-naphthol-3,6-disulphonic acid, 20 ml of 24 percent ammonia, 5 ml of pyridine and 50 grs of ice. Stirring is carried on for one-half hour, the temperature rising to between 15 and 20° C. It is then heated to 80° C and kept at this temperature for one hour. It is mixed with 10 grs of sodium chloride, cooled to 10° C, the precipitated dyestuff is suctioned off and washed with 50 ml of a 10 percent sodium chloride solution. The dyestuff is dissolved in 200 ml of water at 80° C, filtered, the filtrate is mixed with 200 cc of ethanol, cooled to 10° C, the precipitated dyestuff is filtered and is after-washed with 50 cc of 50 percent ethanol.

Yield : 1.6 grs of dyestuff of formula (105) as per Table II.

Example 6

5 grs of 4'4'-diamino-diphenylsulphon are dissoled in 100 ml of water and 20 ml of 37 % HCl and are tetrazotised in the usual manner with 6 ml of 4-n-sodium nitrite. The solution is then added at room temperature to a solution of 15 grs of 2-amino-8-naphthol-6-sulphonic acid in 200 ml of water and 8 grs of sodium carbonate. Stirring is then carried on for one-half hour at room temperature and subsequently for one-half at 80° C, it is then mixed with 30 grs of sodium chloride, cooled to 10° C, suctioned off, washed with 100 ml of 10 percent sodium chloride solution and dried in a vacuum at 80° C. The residue is then dissolved in 100 ml of dimethyl formamide at 100° C, is filtered and the filtrate is precipitated with 1 litre of acetone.

Yield : 7 grs of the dyestuff of formula (107) of Table III.

Example 7

7.1
182-/4'-(2''-chloro-5''-nitrobenzoyl)-benzoylamino/-6-nitro-naphthalene-4,8-disulphonic acid

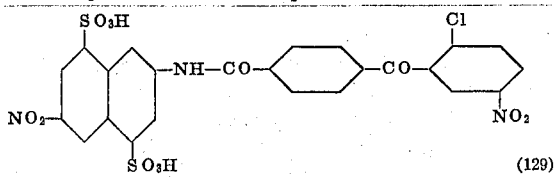
(129)

4.24 grs of 2-amino-6-nitro-naphthalene-4,8-disulphonic acid are dissolved in 40 ml of n-methylpyrrolidine at 130° C and are then mixed with 100 ml of pyridine. At 100° C, a solution of 4 grs of the production of formula (101b) is added, cooled to 20° C and the production of condensation is precipitated with 250 ml of acetone. It is suctioned off, washed with 50 ml of acetone and dried in a vacuum at 80° C. This product is dissolved in 120 ml of water with the addition of some ammonia, is suctioned off hot and the filtrate is mixed with 30 ml of 24 percent ammonia. Whilst cooling to 10° C, colourless crystals will precipitate which are suctioned off and dried in a vacuum at 70° C. For further purification, it is dissolved in 100 ml of pyridine and 50 ml of water at boiling point.

The product crystallises during cooling at 15° C again.

7.2
182-/4'-(2''-chloro-5''-aminobenzoyl)-benzoylamino/-6-amino-naphthalene-4,8-disulphonic acid

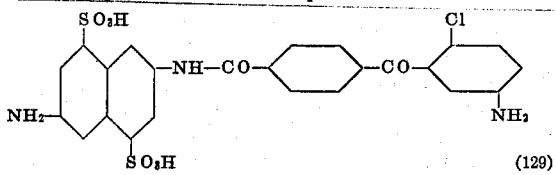
(129)

6 grs of the production of formula (107a) are dissolved in 150 ml of water and 10 ml of 24 percent ammonia, are added at 60° C to a mixture of 40 grs of Fe$_2$SO$_4$·7 H$_2$O, 50 ml of water and 50 ml of 24 % ammonia, heated to the boil, suctioned off hot, mixed with 20 ml of hot water, the filtrate is set to pH 0.5 with 37 % HCl, cooled, suctioned off, washed with water and dried in a vacuum at 80° C.

Yield : 4.6 grs of the product of formula (129b).
7.3   Production of the dyestuff of formula (129) as per Table I is carried out analogously to 1.5.

Example 8

8.1   5 grs of diamino-phenyl sulphon are tetrazotised as per 6.1 and coupled, analogously to Example 6, with 18 grs of 2,2',6-dimethylphenylamino-8-naphthol-6-sulphonic acid sodium. 11.2 grs of dyestuff of formula (108) as per Table I will be obtained.

Example 9

9.1   Hydroquinone-2',2''-di-(nitrophenyl ether)-4',4''-disulphonic acid

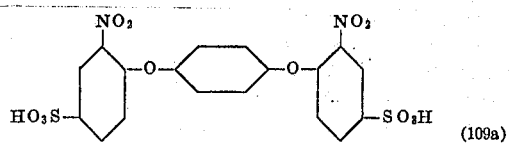
(109a)

5.5 grs of hydroquinone, 1 g of sodium sulphite and 4 grs of sodium hydroxide, dissolved in 70 ml of water, are added to a solution of 28 grs of 4-chloro-3-nitrobenzene sulphonic acid potassium in 200 ml of water and are heated for 6 hours to 95° C whilst being stirred. The solution is then mixed with 90 grs of sodium chloride and cooled to 5° C. It is suctioned off and after-washed with a 25 percent sodium chloride solution and is then dried in a vacuum at 80° C. It is then dissolved in 30 ml of hot dimethyl formamide, suctioned off hot from the undissolved sodium chloride and precipitated from the filtrate with acetone to supply the di-sodium salt.

Yield : 16 grs of the sodium salt of the product of formula (109a).

9.2   Hydroquinone-2',2''-di-(aminophenyl ether)-4',4''-disulphonic acid

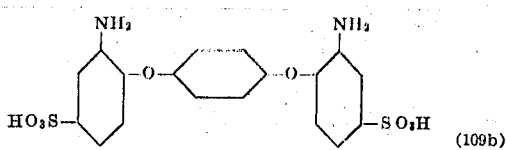
(109b)

2.5 grs of iron, 7.5 ml of 27 % HCl and 50 ml of water are stirred for 3 hours on the steam bath, 2.5 grs of the substance of formula (109a) are added and stirring continues for a further 4 hours. Then the pH value is set to 9 with sodium carbonate, the solution is suctioned off hot and is after-washed with 20 ml of hot water. The filtrate is set to pH 3 with HCl, cooled to 5° C, the precipitated crystals are suctioned off and are recrystallised from water.

Yield : 1.2 grs of the product of formula (109b)
9.3   Production of dyestuff of formula (109) of Table I is carried out analogously to the description in 4.3.

Example 10

4,4'-di-(4'',4'''-nitrophenoxyphenyl)-sulphon-2'',2'''-disulphonic acid

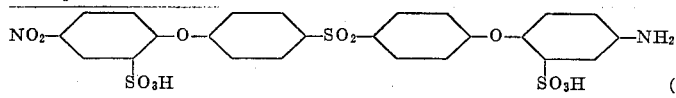

(110a)

75 grs of 4,4'-dihydroxy-diphenylsulphon, 1200 ml of N-methylpyrrolidine, 60 ml of 10 n-sodium hydroxide solution, 198 grs of 2-chloro-5-nitrobenzene-sulphonic acid sodium (78 percent) are boiled for 1½ hours whilst stirred, 600 ml of N-methylpyrrolidine are distilled off and the residue is stirred into 3 litres of diethyl ether. The ether is poured off the separated oil and the oil is boiled for 10 minutes with 1 litre of isopropanol, cooled to 20° C, the precipitated crystals are suctioned off, washed with 500 ml of isopropanol and dried in a vacuum at 80° C. After re-crystallisation from 500 ml of glacial acetic acid and 50 grs of carbon, 72 grs of colourless crystals of formula (110a) are obtained.

10.2 184,4'di-(4'',4'''-aminophenoxyphenyl)-sulphon-2'',2'''-di-sulphonic acid

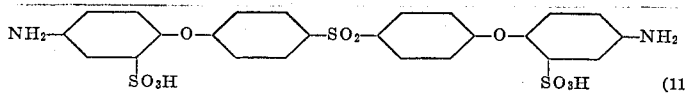

(110b)

6 grs of iron, 6 ml of 37 % HCl and 100 ml of water are heated whilst being stirred on the steam bath for 4 hours and 6 grs of the product of formula (110a) are then added. Stirring on th steam bath is continued for 4 hours, pH 9 is then set by the addition of sodium carbonate, the mixture is suctioned off hot, the filtrate is set to pH 1 with HCl, is cooled to 20° C, the precipitate is suctioned off, washed after with 100 ml of water and 50 ml of ethanol and dried in a vacuum at 80° C.

Yield : 3.8 grs of the compound of formula (110b).

10.3  Production of the dyestuff of formula (110)

0.74 grs of the substance of formula 110b) are dissolved in 15 ml of water and 0.1 grs of sodium hydroxide. 0.175 grs of sodium nitrite is then added. This solution is slowly poured into a mixture of 300 ml of water, 100 grs of ice and 10 ml of 37 % HCl. A clear tetrazo solution will be created.

1.3 grs of 2-(2',6'-dimethylphenylamino)-8-hydroxynapthalene-6 sulphonic acid sodium are dissolved in 20 ml of water and the tetrazo solution is poured in. Stirring is carried on at room temperature for 2 hours, the solution is then heated to 100° C, 300 ml of water being distilled off. The residual dyestuff solution is mixed with 30 grs of potassium acetate, cooled to 10° C, the precipitated dyestuff is suctioned off, washed first with 100 ml of 20 percent potassium acetate solution and then with 50 ml of alcohol, boiled for 10 minutes with 30 ml of methanol, suctioned off hot and washed with 30 ml of methanol.

0.6 grs of dyestuff of formula (110) as per Table III will be obtained.

Example 11

5 grs of 4,4'-diamino-diphenylsulphon are tetrazotised as per Example 6 and mixed into a solution of 21 grs of 1-benzoyl-amino-8-naphthol-3,6-disulphonic acid sodium in 100 ml of water and 10 ml of pyridine, the pH value being kept at 9 by letting ammonia drip in and the temperature being kept to between 5 and 10° C. Stirring is continued for 2 hours at room temperature, same is then rasied to 60° C within 30 minutes. After cooling to 20° C, the solution is mixed with 30 grs of sodium chloride, suctioned off, washed with a 30 % sodium chloride solution until same discharges colourless and dried in a vacuum at 60° C. The dry dyestuff is dissolved in 50 ml of dimethyl formamide at 110° C, filtered off from the undissolved salt and precipitated from the mother lye with 200 ml of dioxane. It is then suctioned off, after-washed three times with 20 ml of dioxane and dried in a vacuum at 100° C.

Yield : 9.2 grs of dyestuff of formula (111) as per Table III.

Example 12

0.37 grs of diamino-disulphonic acid of formula (110b) are dissolved in 10 ml of water and 3 drops of a 10-n-sodium hydroxide solution, the solution being mixed with 0.5 ml of 4n-sodium nitrite solution. This solution is added all at once to a mixture of 100 ml of water, 50 grs of ice and 3 ml of 37 % HCl.

0.9 grs of N-benzoyl-1-hydroxy-8-amino-naphthalene-3,6-disulphonic acid (75 percent) are dissolved in 10 ml of water, 10 ml of 24 percent ammonia and 4 ml of pyridine. The tetrazo solution is poured into this sulphonic acid solution at 2° C and is stirred for 1 hour at room temperature. It is then heated to 80° C. At this temperature, it is then mixed with 35 grs of potassium acetate, cooled to 10° C, suctioned off, washed with 50 ml of 20 percent potassium acetate solution, then with 20 ml of ethanol and drued in a vacuum at 60° C. The dry dyestuff is dissolved in 15 ml of dimethyl formamide at 10° C, suctioned off and the mother lye is precipitated with 50 ml of dioxane. The precipitated dyestuff is suctioned off, washed with 20 ml of dioxane and dried in a vacuum at 60° C. The dyestuff of formula (112) as per Table II will be obtained.

Example 13

The production of the dyestuff of formula (113) as per Table III is carried out analogously to the description in Example 12.

Example 14

14.1  4,4'-di-(4'',4'''-nitrophenoxy)-diphenyl-3'',3'''-disulphonic acid

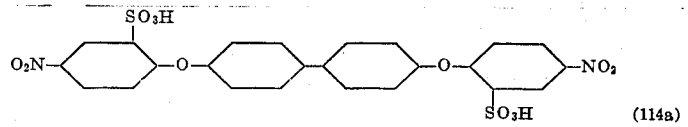

(114a)

1.85 grs of 4,4'-dihydroxyphenyl are dissolved in 10 ml of N-methyl purrolidine, mixed with 2 ml of 10-n-sodium hydroxide solution and added to a solution of 6.65 grs of 2-chloro-5-nitrobenzene-sulphonic acid sodium in 20 ml of N-methylpyrrolidine. The solution is boiled for 18 hours and stirred into 300 ml of diethyl ether. The ether is decanted and the residue is boiled for 5 minutes with 100 ml of ethanol. After cooling to room temperature, it is suctioned off, the substance on the filter is washed with 20 ml of ethanol and is re-crystallised from 10 ml of glacial acetic acid.

Yield : 3.2 grs of the compound of formula (114a) are ob-tained.

14.2 4,4'-di-(4'',4'''-aminophenoxy)-diphenyl-3'',3'''-disulphonic acid

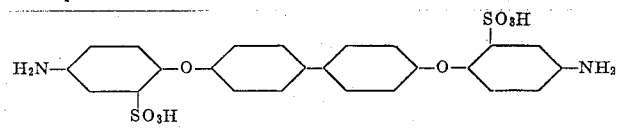
(114b)

14.5 grs of iron powder, 15 ml of 37 % HCl and 30 ml of water are boiled for 1 hour. Then, 45 ml of water and within 30 minutes, 16 grs of the compound of formula (114a) are added. This is boiled for 3 hours, set to pH 9 with sodium carbinate, suctioned off the iron oxide, the filtrate is set to pH 0.5 with 37 % HCl. The precipitated amine is suctioned off, washed with 200 ml of water and dried in a vacuum at 100° C.

Yield : 8 grs of the compound of formula (114b)

14.3 0.53 grs of the compound from 14.2 are dissolved in 3 ml of 94 percent sulphuric acid and mixed with 0.2 grs of sodium nitrite at 2° C whilst stirring. Stirring continues for 3 hours at 2° C and the solution is then applied to 50 grs of ice. A clear soltuion of the tetrazo compound is created in which the excess nitrous acid is destroyed by the addition of sulfamic acid. 1.5 grs of 1(4'-glutaroylamino-benzoylamino)-8-naphthol-3,6-disulphonic acid are dissolved in 20 ml of water, 15 ml of 24 percent ammonia and 3 ml of pyridine. The tetrazo solution produced above is poured into this solution at 2° C, this is then stirred for 1 hour at room temperature and then heated to 60° C within 30 minutes. 20 grs of potassium acetate is then added, cooled to 10° C, the precipitated dyestuff is suctioned off, washed out with 20 ml of 20 percent potassium acetate solution and dried in a vacuum at 60° C. The dry dyestuff is dissolved in 10 ml of dimethylsulfoxide at 100° C, filtered, the dyestuff is precipitated from the filtrate with the same volume of methanol, suctioned off and washed with 20 ml of methanol. After drying in a vacuum at 60° C, 0.4 grs of dyestuff of formula (114) as per Table III will be obtained.

Example 15

The production of the dyestuff of formula (115) as per Table II is carried out analogously to Example 14 from 1-N-benzoylamino-8-naphthol-3,6-disulphonic acid.

Example 16

2 grs of 4,4'-diamino-diphenyl ether is dissolved in 40 ml of water and 7 ml of 37 % HCl and 20 grs of ice and 1.46 grs of sodium nitrite are added.

9.1 grs of 2-(2',6'-dimethylphenylamino)-8-naphthol-6-sulphonic acid sodium are dissolved in 50 ml of water, cooled to 5° C and poured into the tetrazo solution above. Stirring carries on for 3 hours at room temperature, the precipitated dyestuff is then suctioned off, washed with 20 ml of water and dried in a vacuum at 90° C. The dry dyestuff is dissolved in 50 ml of dimethylformamide at 110° C, filtered, precipitated with 150 ml of isopropanol from the filtrate, suctioned off and washed with 50 ml of isopropanol.

Yield : 4.6 grs of dyestuff of formula (116) as per Table I.

Example 17

The production of the dyestuff of formula (117) as per Table I takes place analogously to Example 1.

Example 18

2 grs of 4,4'-diamino-diphenyl ether are being tetrazotised as stated in Example 16.

11.76 grs of 1-N-benzoylamino-8-naphthol-3,6-disulphonic acid sodium are dissolved in 50 ml of hot water, cooled to room temperature, set to pH 8 with 5 ml of pyridine and ammonia and the tetrazo solution is then slowly added, the pH value kept to 8 by the addition of ammonia. Stirring at room temperature for 1 hour, the solution is then heated to 60° C within 30 minutes, is mixed with 10 grs of sodium chloride, cooled to 10° C. The precipitated dyestuff is suctioned off, washed with 5 percent sodium chloride solution, until same discharges almost colourless and dried in a vacuum at 80° C.

Yield : 6.3 grs of dyestuff of formula (118) as per Table II.

Example 19

Production of the dyestuff of formula (119) as per Table I takes place analogously to Example 1.

Example 20

20.1 4,4'-di-(m-nitro-p-chlorobenzoyl)-diphenyl

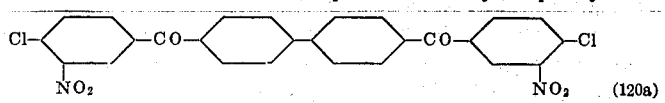
(120a)

300 ml of 1,2-dichlorobenzene, 70 grs of diphenyl and 220 grs of 4-chloro-3-nitrobenzoylchloride are mixed with 220 grs of aluminium chloride and heated to 130° C in 90 minutes. The mixture is then poured over 3 kilos of ice and 100 ml of 30 % HCl and the dichlorobenzene is distilled off with steam. The residue is suctioned off and is boiled for 5 minutes with 2 litres of ethanol. A white powder is obtained which is crystallised from 400 ml of dimethyl formamide.

Yield : 224 grs of the compound of formula (120a) with a melting point of 214° C.

20.2 4,4'-di-(m-amino-p-chlorobenzoyl)-diphenyl

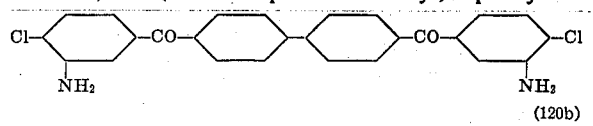
(120b)

10 grs of the product of formula (120a) are heated with 10 grs of tin chips and 80 ml of 37 percent HCl. As soon as the tin is dissolved, water (110 ml) is mixed in, the precipitated crystals are suctioned off and re-crystallisation takes place from dimethylformamide.

Yield : 7 grs

Melting point : 283° C.

20.3 Production of the dyestuff of formula (120)

1.65 grs of the product of formula (120b) are dissolved in 15 ml of 94 percent sulphuric acid, 0.8 grs sodium nitrite is added and the whole is stirred for 4 minutes at between 0° and 2° C. Subsequently, the mixture is diluted to 100 ml with iced water.

2.8 grs of 2-(2'6'-dimethylphenylamino)-8-naphthol-6-sulphonic acid sodium are dissolved in 80 ml of water and the diazo solution is added all in one at 10° C. Stirring continues at room tempera-ture for 2 hours, the precipitated dyestuff is then suctioned off and washed with 200 ml of 2.5 percent sodium chloride solution, to which has been added 5 ml of a 24 percent ammonia, and subsequently with 200 ml of a 1.25 percent sodium chloride solution. After drying, the dyestuff is dissolved in 50 ml of dimethyl formamide, to which have been added 5 ml of pyridine, filtered, precipitated from the filtrate with 200 ml of isopropnaol, suctioned off and dried at 100° C. The dyestuff of formula (120) as per Table I will be obtained.

Example 21

Production of the dystuff of formula (121) as per Table II takes place analogously to Example 20.

Example 22

22.1  1,3-di-(p-nitrophenylmercapto)-benzene-m-disulphonic acid

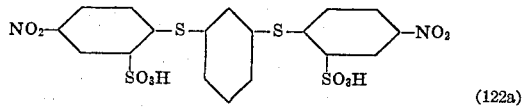

(122a)

3.5 grs of 1,3-dimercaptobenzene are heated in 30 ml of water with 2 grs of sodium hydroxide and 13 grs of 5-nitro-2-chlorobenzene-sulphonic acid sodium to 95° C, whilst being stirred for 14 hours and are then mixed with 150 ml of 25 percent sodium chloride solution, cooled to 10° C. The precipitated product is suctioned off with 150 ml of 25 percent sodium chloride solution, is washed and dried in a vacuum with 100° C. This product is used directly for the following reaction.

22.2
181,3-di-(p-aminophenylmercapto)-benzene-m-disulphonic acid

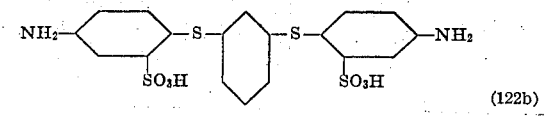

(122b)

11 grs of iron powder, 15 ml of 37 % HCl and 50 ml of water are kept at 95° C for 1 hour whilst being stirred and then, a solution of 11 grs of the product of formula (122a), dissolved in 100 ml of water, is added within 30 minutes. The mixture is heated to 95° C for 2 hours, is set to pH 9 with sodium carbonate, suctioned off and after-washed twice with 20 ml of water each time, which has a temperature of 80° C. The filtrate is set to pH 0.5 with 37 % HCl, is cooled in ice for 4 hours, the precipitated crystals are suctioned off, washed with 100 ml of water and dried in a vacuum at 80° C. The well-dried product is heated with 50 ml of dimethyl formamide and 5 ml of pyridine to 100° C for 10 minutes, stirring continuing, is then suctioned off hot and washed with 50 ml of dimethyl formamide and subsequently with 100 ml of methanol after which it is dried. It is then dissolved in 50 ml of boiling water, 2 ml of 24 percent ammonia being added, 1 g of animal charcoal is added, suctioned off hot, the filtrate is mixed with 2 grs of ammonia chloride and cooled to 2° C. The precipitated colourless crystals are suctioned off, 3 times washed with 10 ml of water, then with 20 ml of methanol and dried in a vacuum at 60° C.

Yield : 7.4 grs of the product of formula (122b).

22.3 Production of the dyestuff of formula (122)

0.5 grs of the product of formula (122b) are dissolved in 10 ml of water with the addition of 0.17 sodium netrite and is then slowly added to a mixture of 20 grs of ice and 2 ml of 37 percent HCl. Stirring continues for 2 hours at 5° C, the precipitated tetrazo compound is then suctioned off, washed three times with 2 ml of iced water and is then stirred into a solution of 1 g of 2-(2',6'-dimethylamino)-8-naphthol-6-sulphonic acid in 15 ml of water and 1 ml of formic acid. Stirring continues for 1 hour at room temperature, after which the mixture is heated to 60° C. After cooling to 10° C, it is mixed with 40 ml of 20 percent alcoholic potassium acetate solution, suctioned off, washed with 100 ml of a mixture of 30 ml of water and 60 ml of 20 percent alcoholic potassium acetate solution and then with 100 ml of ethanol. The dyestuff is dried in a vacuum at 70° C.

Yield : 0.96 grs of the potassium salt of the dyestuff of formula (122) as per Table I.

Example 23

23.1  4-amino-4'-nitrodiphenylamine-3,3'-disulphonic acid

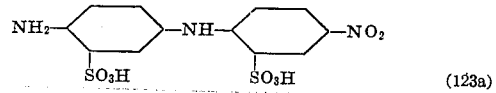

(123a)

37.6 grs of p-phenylanediaminesulphonic acid, 66 grs of 2-chloro-5-nitro-benzene sulphonic acid sodium, 33.6 grs of sodium bicarbonate and 300 ml of water are boiled for 12 hours whilst stirring, are then mixed with 60 grs of sodium chloride and cooled to 10° C. The precipitated crystals are suctioned off, washed with 100 ml of 25 percent sodium chloride solution and dried at 100° C in a vacuum. This product is dissolved in 150 ml of dimethyl formamide, filtered off from the undissolved sodium chloride, the filtrate is mixed with 50 ml of 20 percent alcoholic potassium acetate solution and 1 litre of ethanol, cooled to 10°C, the precipitated yellow potassium salt is suctioned off and washed out with 100 ml of ethanol.

Yield : 71 grs of the potassium salt of the compound of formula (123a)

23.2 Production of the nitroazo dyestuff of formula

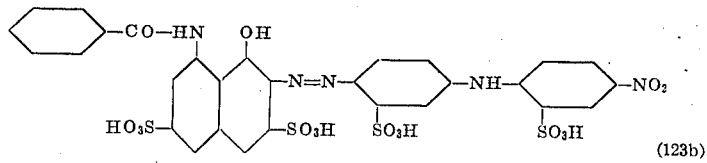

(123b)

7.8 grs of the product of formula (123a) are dissolved in 100 ml of water and 10 ml of 4-n-sodium nitrite solution and are let to drip into a mixture of 40 grs of ice, 20 ml of 37 % HCl and 100 ml of ethanol, whilst being stirred for 15 minutes. Stirring is continued for 3 hours at 3° C and the mixture is then diluted to 1 litre with iced water. The excess of sodium nitrite is then removed with sulphamic acid. This diazo compound is left to flow into a solution of 9 grs of 1-benzoyl-amino-8-naphthol-3,6-disulphonic acid in 40 ml of water, 25 ml of 27 percent ammonia and 12 ml of pyridine at between 3° and 5° C within 1 hour, it being stirred for 2 hours at room temperature, after which it is heated to 80° C. The dyestuff solution is mixed with 500 grs of potassium acetate, cooled to 10° C, the precipitated dyestuff is suctioned off and washed on the filter with 20 percent aqueous potassium acetate solution until same discharges colourless, is then washed with 100 ml of ethanol and dried in a vacuum at 60° C.

Yield: 4.7 grs of the potassium salt of the dyestuff of formula (123b)

23.3 Production of the amino-azo dyestuff of the formula

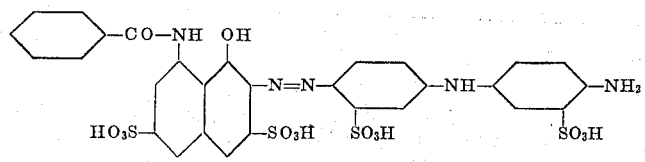

(123c)

3.6 grs of the nitroazo dyestuff of formula (123b) are dissolved in 70 ml of water and the solution is set to 10.2 with 10 n sodium hydrixude solution. It is then heated to 40° C and a solution of 2.5 grs of $Na_2S \cdot 9H_2O$ in 10 ml of water is added. The pH value rises to 12.5.

When the reduction is terminated, 2 grs of sodium bicarbonate are added, filtration is carried out and the filtrate is evaporated in a vacuum to 40 ml, is mixed with 20 ml of ethanol, cooled to 20° C and suctioned off, the filtrate is then mixed with 90 ml of 20 percent alcoholic potassium acetate solution, is cooled to 0° C, the precipitated dyestuff is suctioned off and washed out on the filter with 50 ml of ethanol.

Yield: 2.1 grs of potassium salt of the dyestuff of formula (123c).

23.4 Production of the dyestuff of formula (123)

2 grs of aminoazo dyestuff of formula (123a) are mixed into 20 ml of dimethyl formamide, 2 ml of pyridine is added and the whole is mixed at 110° C with a solution of 0.8 grs of iso-phthalic acid dichloride in 3 ml of acetone. It is kept at 120° C for another 15 minutes and the reactive solution is then poured into 100 ml of iso-propanol. It is suctioned off and the dyestuff is after-washed with 50 ml of iso-propanol.

Yield: 1.4 grs of the potassium salt of the dyestuff of formula (123) as per Table II.

Example 24

4.7 grs of the nitro-amino compound of formula (123a) are dissolved in 25 ml of water, mixed with 5 ml of 4n-sodium nitrite solution and left to drip into a mixture of 100 grs of ice and 5 ml of 37 % HCl within 1 hour. Stirring is continued for another hour at between 3° and 5° C and then, the excess nitrous acid is removed with a 1n-sulphamic acid solution. A pH value of 2 is then produced with sodium acetate and a solution of 4.5 grs of 2-(2',6'-dimethylphenylamino)-8-naphthol-6-sulphonic acid is added all at once. Stirring continues for 4 hours at room temperature and for 1 hour at 50° C, 10 grs of infusion earth is added, it is then suctioned off and after-washed with 50 ml of water. The filtrate is mixed with 50 grs of sodium chloride and cooled to 5° C, suctioned off, washed with a 20 percent sodium chloride solution and dried in a vacuum at 100° C.

Yield: 13 grs. This product is dissolved in 100 ml of dimethyl sulphonamide, suctioned off the undissolved sodium chloride and the dyestuff is precipitated from the filtrate with 200 ml of isopropanol.

Yield: 5.7 grs of the sodium slat of the dyestuff of formula (124) as per Table IV.

Example 25

25.1 Production of the dyestuff of formula

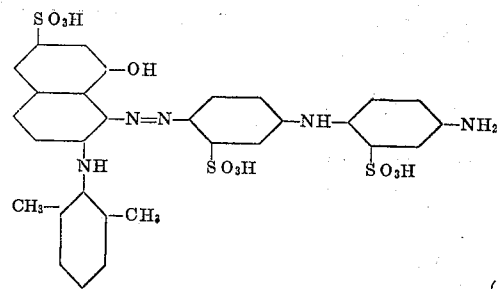

(125a)

4.5 grs of the dyestuff produced in accordance with the above details of formula (124) are dissolved in 80 ml of water and are mixed at 40° C to a solution of 4 grs of $Na_2S \cdot 9H_2O$ in 10 ml of water. The pH value amounts to 13.5. Stirring continues for 2 hours at 40° C and the termination of the reduction is controlled by means of thin-layer chromatography. The pH value is brought to 9 by the addition of sodium bicarbonate. The, 28 grs of sodium chloride are added, stirring continues for 1 hour at 5° C, the precipitated dyestuff is suctioned off, washed with 200 ml of 20 percent sodium chloride and dried in a vacuum at 100° C. This product is dissolved in 35 ml of dimethyl formamide at 100° C, suctioned off hot from the undissolved sodium chlride, the dyestuff is precipitated from the filtrate with 150 ml of iso-propanol, is suctioned off, washed with 50 ml of isopropanol and dried in a vacuum at 100° C.

Yield: 3.2 grs of the sodium salt of the compound of formula (125a).

25.2 Production of the dyestuff of formula (125)

1.4 grs of the dyestuff of formula (125a) are dissolved in 10 ml of water, mixed with 20 ml of a α-naphthalene sulphonic acid sulphuric acid solution (1 litre of this solution contains 1 mol of α-naphthalene sulphonic acid and 1 mol of sulphuric acid), cooled to 10° C and added to 5 ml of 4n-sodium nitrite solution. This diazo solution is put at 10° C all at once into a solution of 1.4 grs of 1-benzoylamino-8-naphthol-3.6-disulphonic acid, stirred for 4 hours at room temperature and the dyestuff is precipitated with 300 ml of iso-propanol. 0.8 grs of dyestuff of formula (125) as per Table III are obtained and same is purified chromatographically.

Example 26

26.1 1-(4'-nitrobenzoylbenzene)-4-carboxylic acid-3''-aminophenylamide-4''-sulphonic acid of formula (103c) is produced as per instruction 3.3

26.2 Production of the nitroazo dyestuff of formula

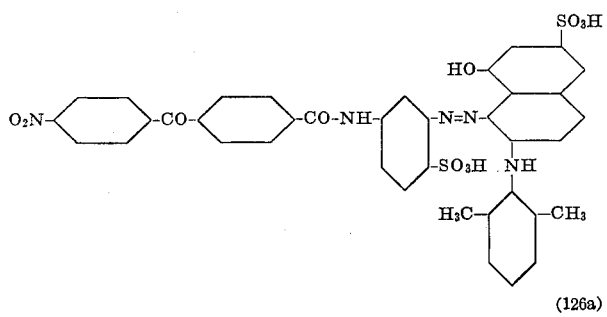

(126a)

1.4 grs of sodium nitrite are dissolved in 15 ml of 96 percent sulphuric acid at between 0° and 10° C, then slowly heated to 70° C and re-cooled to 20° C. Within 1 hour, 8.4 grs of the compound of formula (103c) is added and stirred for 2 hours at 20° C. This creates a clear solution which is stirred into a mixture of 50 grs of ice and 100 ml of water. The diazo compound precipitates, is suctioned off and washed with 200 ml of iced water. This diazo compound is carried into a solution of 3.8 grs of 2-(2',6'-dimethylphenylamino)-8-naphthol-6-sulphonic acid, cooled to 5° C in 200 ml of water and stirs it at room temperature for 12 hours. It is then mixed with 300 ml of water and 100 grs of sodium chloride, heated to 90° C, cooled down to 10° C, the precipitated dyestuff is suctioned off and washed with 500 ml of 2.5 percent sodium chloride solution.

Yield : 7.9 grs of the sodium salt of the compound of formula (126b).

2.6.3 Production of the nitro group of the dyestuff of formula (126a)

15 grs of the dyestuff of formula (126a) are dissolved in 20 ml of N-methylpyrrolidine, 5 ml 27 percent ammonia and a solution of 8 grs of $Na_2S \cdot 9H_2O$ in 30 ml of water is added at 50° C. After 1 hour of stirring at 50° C, the reduction is terminated, as long as the thin-layer chromatograph shows a brownish-red colour after diazotising and coupling with β-naphthol. 10 grs of sodium bicarbonate and 150 ml of 25 percent sodium chloride solution are then added, the solution is suctioned off and after-washed with 100 ml of 25 percent sodium chloride solution. The residue is boiled up with 50 ml of 10 percent sodium chloride solution, cooled down to 10° C, suctioned off, the dyestuff is washed with 50 ml of 2.5 percent sodium chloride solution and dried in a vacuum at 100° C.

Yield : 6.3 grs.

26.4 Production of the dyestuff of formula 26

1.2 grs of the dyestuff obtained as per 26.3 are dissolved in 25 ml of dimethyl formamide and are mixed with 5 ml of naphthalene sulphonic acid-sulphuric acid (see 25.2) and 2 ml of 4n-sodium-nitrite solution at 3° C. Stirring continues for 5 hours at between 3° and 5° C, the excess nitrous acid is removed with 1 n-sulphanilic acid solution and a solution of 1 g of 1-benzoylamino-8-naphthol-3.6-disulphonic acid in 3 ml of pyridine and 3 ml of 27 % ammonia is added. Stirring continues for 12 hours at room temperature, it is then suctioned off and after-washed with 100 ml of isopropanol. Ater drying in a vacuum at 100° C, the dyestuff is extracted with alcohol for 12 hours.

This yields 0.6 grs of dyestuff of formula (126) as per Table III.

Example 27

1.4 grs of aminoazo dyestuff of formula (125a) are dissolved in 20 ml of N-methylpyrrolidine, mixed with 5 ml of pyridine and heated to 110° C. Then, 0.5 ml of benzoylchloride are added all at once, the temperature will rise to 115° C. The reactive solution is diluted with 300 ml of a 10 percent sodium chloride solution and the pH value is set to 0.5 with 37 % HCl. The precipitated dyestuff is suctioned off, after-washed with 50 ml of a 5 percent sodium chloride solution and dried in a vacuum at 60° C. It is then boiled with 50 ml of isopropanol, suctioned off hot and after-washed with 20 ml of hot isoropanol.

Yield : 1.3 grs of the dyestuff of formula (127) as per Table IV.

Example 28

The dyestuff of formula (128) as per Table IV is obtained in accordance with the specification of Example 27 by the acylising of the aminoazo dyestuff of formula (125a) with a capronic acid.

The following Tables I to IV show a summary of the dyestuffs of formulas (101) to (128). In all tables:
Column (1) – formula No.
Column (2) — Example No.
Column (3) — maximum absorption in nm
  a) measured in $DMF/H_2O$ 1:1
  b) measured in gelatine The other symbols in Tables I to IV relate to the following formulas:

TABLE I

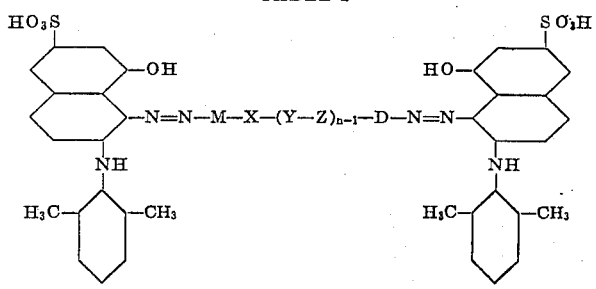

TABLE II

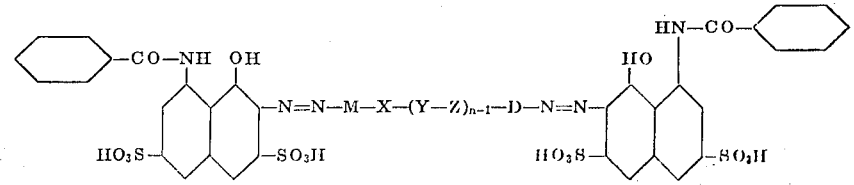

TABLE III

A—N=N—M—X—(Y—Z)$_{n-1}$—D—N=N—E

TABLE IV
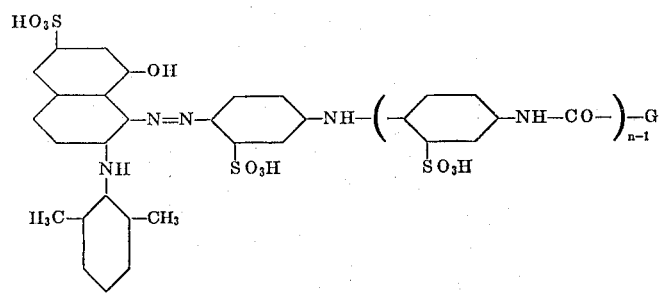
TABLE I
| (1) | (2) | M | X | Y | Z | n | D | (3)(a) | (3)(b) |
|---|---|---|---|---|---|---|---|---|---|
| 101 | 1 | ⬡–Cl | –CO– | ⬡ | –CO–NH– | 2 | ⬡–SO₃H | 532/550 | 538/558 |
| 102 | 2 | ⬡(Cl) | –CO– | ⬡ | –CO–NH– | 2 | ⬡–SO₃H | 529/548 | 540/568 |
| 103 | 3 | ⬡ | –CO– | ⬡ | –CO–NH– | 2 | ⬡–SO₃H | 538 | 531/559 |
| 104 | 4 | ⬡–SO₃H | –O– | ⬡ | O | 2 | ⬡–SO₃H | 518/536 | 512/540 |
| 129 | 7 | ⬡–Cl | –CO– | ⬡ | –CO–NH– | 2 | naphthyl(SO₃H)₂ | 534 | 544 |
| 108 | 8 | ⬡ | –SO₂– | ......... | ......... | 1 | ⬡ | 542/564 | 545/590 |
| 109 | 9 | ⬡–SO₃H | –O– | ⬡ | –O– | 2 | HO₃S–⬡ | 524/544 | 520/548 |
| 110 | 10 | ⬡–SO₃H | –O– | ⬡–SO₂–⬡ | –O– | 2 | ⬡–SO₃H | 530 | 520/540 |
| 116 | 16 | ⬡ | –O– | ......... | ......... | 1 | ⬡ | 518/544 | 520/550 |
| 117 | 17 | ⬡–Cl | –CO– | ⬡ | –CO–NH– | 2 | ⬡–SO₃H | 536 | 536/558 |
| 119 | 19 | ⬡ | –CO– | ⬡ | –CO–NH– | 2 | ⬡–SO₃H | 530/553 | 535/561 |
| 120 | 20 | ⬡–Cl | –CO– | ⬡–⬡ | –CO– | 2 | ⬡–Cl | 524/545 | 527/560 |
| 122 | 22 | ⬡–SO₃H | –S– | ⬡ | –S– | 2 | ⬡–SO₃H | 522/550 | 527/560 |

TABLE II
| (1) | (2) | M | X | Y | Z | n | D | (3)(a) | (3)(b) |
|---|---|---|---|---|---|---|---|---|---|
| 105 | 5 | 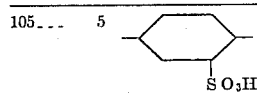 | —O— |  | —O— | 2 | 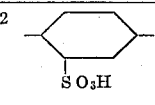 | 530/556 | 529/558 |
| 111 | 11 | 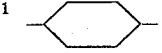 | —SO₂— | -------- | | 1 |  | 520/544 | 526/550 |
| 112 | 12 | 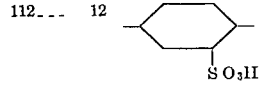 | —O— | 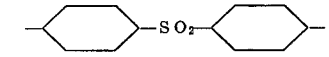 | —O— | 2 | 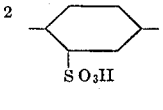 | 528/544 | 524/550 |
| 115 | 15 | 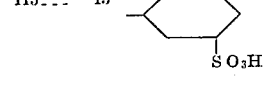 | —O— | 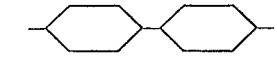 | —O— | 2 | 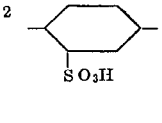 | 544 | 546 |
| 118 | 18 |  | —O— | -------- | | 1 |  | 536/568 | 520/558 |
| 121 | 21 | 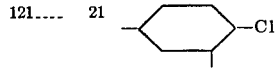 | —CO— | 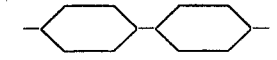 | —CO— | 2 | 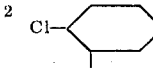 | 515 | 520/558 |
| 123 | 23 | 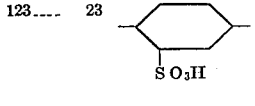 | —NH— | 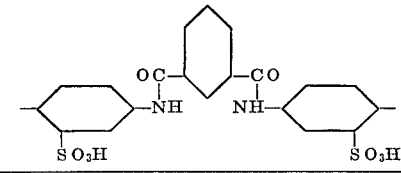 | —NH— | 2 | 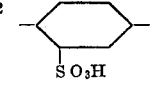 | 535/610 | 600 |

TABLE III

| (1) | (2) A | M | X | Y | Z | n | D | E | (3)(a) | (b) |
|---|---|---|---|---|---|---|---|---|---|---|
| 107 | 6 | [ring] | —SO₂— | ---- | | 1 | [ring] | [structure] | 536 | 528/562 |
| 125 | 25 | [ring-SO₃H] | —NH— | ---- | | 1 | [ring-SO₃H] | [structure] | 620 | 620/660 |
| 126 | 26 | [ring] | —CO— | [ring] | —CONH— | 2 | [ring-SO₃H] | [structure] | 520/542 | 545/562 |
| 113 | 13 | [ring-SO₃H] | —O— | [ring-SO₂-ring] | —O— | 2 | [ring-SO₃H] | [structure] | 524/546 | 530/550 |

TABLE IV

| (1) | (2) | n | G | (3)(a) | (3)(b) |
|---|---|---|---|---|---|
| 124 | 24 | 1 | 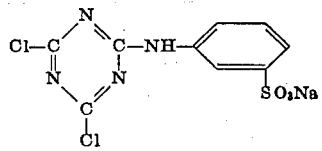 | 545/572 | 512/575 |
| 127 | 27 | 2 | —⟨ ⟩ | 548/570 | 555/578 |
| 128 | 28 | 2 | —n—$C_5H_{11}$ | 550/568 | 556/574 |

EMBODIMENTS

Example 1

3.3 ml of 6 percent gelatine solution, 2.0 ml of a 1 percent aqueous solution of the hardener with the formula

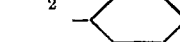

(29)

0.5 ml of a 1 percent aqueous solution of the purple dyestuff of formula (104) and 3.3 ml of silver bromide emulsion containing 35 grs of silver per litre are pipetted into a reaction vessel which is filled up to 10.0 ml with de-ionised water. This solution is forcefully mixed and kept at 40° C for 5 minutes in a water bath.

The pouring solution with a temperature of 40° is poured onto a subtrated glass plate, size 13 cm × 18 cm. After setting at 10° C, the plate is dried in a drying cupboard with circulating air of 32° C.

A strip from this plate cut to 3.5 cm × 18 cm is exposed to 500 Lux/cm² through a Kodak 2b + 49 blue filter for 24 seconds under a step wedge.

Further procedures are as follows:

1. 10 minutes of developing in a bath containing per litre 1 g of p-methylaminophenolsulphate, 20 grs of water-free sodium sulphite, 4 grs of hydroquinone, 10 grs of water-free sodium carbonate and 2 grs of potassium bromide.
2. soaking for 2 minutes.
3. stop-fixing for 6 minutes in a bath containing per litre 200 grs of crystallised sodium sulphate, 15 grs of water-free sodium thiosulphate, 25 grs of crystallised sodium acetate and 13 ml of glacial acetic acid.
4. soaking for 8 minutes.
5. colour bleach for 20 minutes in a bath containing per litre 27.5 ml of 96 % sulphuric acid, 10 grs of potassium iodide and 15 ml of a solution of 0.3 grs of 2,3-dimethyl-6-aminoquinoxaline in 50 ml of ethanol.
6. soaking for 4 minutes.
7. residual silver bleach for 8 minutes in a bath containing per litre 50 grs of potassium ferricyanide, 15 grs of potassium bromide, 10 grs of di-sodium phosphate and 14 grs of mono-sodium phosphate.
8. soak for 6 minutes.
9. fix for 6 minutes as stated in 3)
10. soak for 10 minutes.

A brilliant, highly light-fast purple wedge is obtained which is bleached at the location of the originally highest silver density.

Example 2

The following coast are applied to a white opaque acetate foil provided with an adhesive layer:

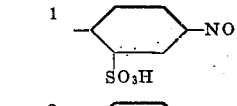

1. Red-sensitive silver bromide emulsion in gelatine, containing the greenish-blue dyestuff of the formula

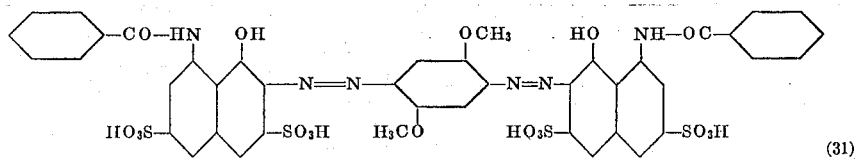

2. Colourless gelatine coat without silver halogenide.
3. Green-sensitive silver bromide emulsion in gelatine, containing the purple dyestuff of formula (111).
4. Blue-sensitive silver bromide emulsion in gelatine containing the yellow dyestuff of formula

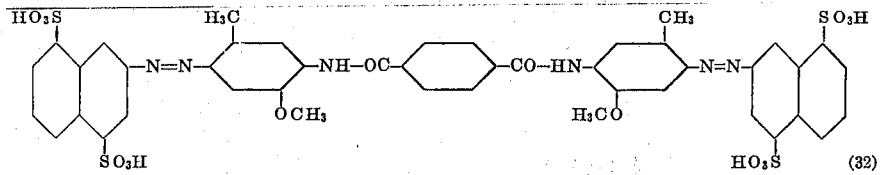

The gelatine layers can also contain additives such as wetting agents, hardening agents and stabilisers for the silver halogenide. Otherwise, procedures ase of such a nature that the separate layers per square metre of film contain 0.5 grs of the relative dyestuff and the quantity of silver bromide corresponding to between 1 and 1.2 grs of silver.

This film is exposed under a coloured transparency with red, green and blue copy light. The copy is then developed in accordance with the following instructions:

1. 6 minutes of development in a bath containing per litre of water, 50 grs of water-free sodium sulphite, 0.2 grs of 1-phenyl-3-pyrazolidine, 6 grs of hydroquinone, 35 grs of water-free sodium carbonate, 4 grs of potassium bromide and 0.3 grs of benz-triazol. 2. Soak for 5 minutes.
3. Fix for 6 minutes in a solution of 200 sodium thiosulphate, crystallizing and 20 grs of potassium metasulphite in 1 litre of water. 4. Soak for 5 minutes.
5. Colour bleaching for 3 to 12 minutes with a solution containing per litre of water 50 to 80 grs of potassium bromide, 40 to 80 grs of thiourethane, 35 to 80 grs of 30 percent sulphuric acid and, if required, 0.001 to 0.01 grs of colour bleach catalyst of formula (30).
6. Soak for 10 minutes.
7. Residual silver bleach for 5 minutes with a solution of 60 grs of crystallised copper sulphate, 80 grs of potassium bromide and 15 ml of 30 % HCl in one litre of water.
8. Soak for 5 minutes.
9. Fix for 5 minutes as stated in 3.
10. Soak for 5 minutes.

A light-fast, document-proof positive survey image is obtained.

Similar results are obtained if instead of the dyestuff of formula (111), one of the dyestuffs of formulas (101), (106), (107) or (117) is used.

Example 3

A test strip produced and exposed with the use of the purple dyestuff of formula (117) and in accordance with example 1, is processed as follows:

1. 5 minutes of developing in a bath containing per litre 1 g of p-methylaminophenolsulphate, 20 grs of water-free sodium sulphite, 4 grs of hydroquinone, 10 grs of water-free sodium carbonate, 2 grs of potassium bromide and 3 grs of sodium rhodanide.
2. Soak for 2 minutes.
3. Treat for 2 minutes in a reversing bath containing per litre 5 grs of potassium bichromate and 5 ml of 96 percent sulphuric acid.
4. Soak for 4 minutes.
5. Treat for 5 minutes in a bath containing per litre 50 grs of water-free sodium sulphite.
6. Soak for 3 minutes.
7. 4 minutes of developing in a bath containing per litre 2 grs of 1-phenyl-3-pyrazolidone, 50 grs of water-free sodium sulphite, 10 grs of hydroquinone, 50 grs of water-free sodium carbonate, 2 grs of sodium hexametaphosphate and 20 ml of a 1 % aquous solution of tertiary butylaminoborane.
8. Soak for 2 minutes.
9. Further processing as stated in Example 3 in 4. to 10.

A brilliant, light-fast, purple wedge opposite ingradation with its original is obtained.

I claim:

1. Silver halide containing photographic material which contains a dyestuff of the formula

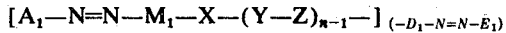

in which $A_1$ and $E_1$ each possesses an N-acylated or non-acylated 1-hydroxy-8-amino-naphthalene-3,5- or 3,6-disulphonic acid radical bonded in the 2-position to the azo group, where the acyl moiety is caproyl, phenylacetyl, nicotinoyl, benzoyl or benzoyl substituted by one or more of chloro, bromo, methoxy, nitro, trifluoromethyl, t-butyl, sulfonamide, N-methylsulfonamide, acetyl, acetylamino, succinylamino, benzoyl, benzoylamino, carboxybenzoylamino, amino, cyano, sulfonic acid, methylsulfonyl and phenylsulfonyl, or a 2-amino-8-hydroxy-naphthalene sulphonic acid residue bonded to the azo group in the 1 position and which is unsubstituted or contains as amine substituents alkyl of 1 to 4 carbon atoms, phenyl or phenyl substituted by one or more of methyl, methoxy, chloro, fluoro, bromo, trifluoromethyl, sulpho, carboxyl, acetyl, sulphomethyl, dimethylcarbamyl, diethylsulfonamide, phenyl and phenoxy, $M_1$ stands for an unsubstituted or substituted benzene radical substituted with halogen atoms, low aklyl or alkoxy groups, sulphonic acid, sulphonic acid amide, carboxylic acid or carboxylic acid amide groups, and $D_1$ stands for an unsubstituted or substituted benzene radical substituted with halogen atoms, lower alkyl or alkoxy groups, sulphonic groups, sulphonic acid amide groups, carboxylic acid or carboxylic acid amide groups or an unsubstituted or substituted naphthalene residue with 1 or 1 sulphonic acid groups as substituents $n$ is 1 or 2, X is —O—, —S—, —SO—, —SO$_2$—, —CO—, $$-\underset{R}{N}-,$$

wherein R is hydrogen or lower alkyl, Y is

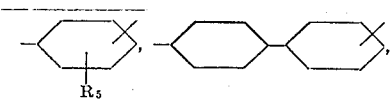

or

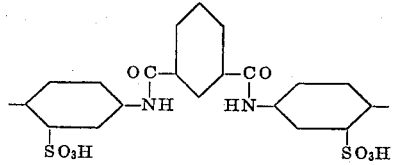

wherein $R_5$ is hydrogen or $SO_3H$ and Z is $-O-$, $-S-$, $-SO-$, $-SO_2-$, $-CO-$,

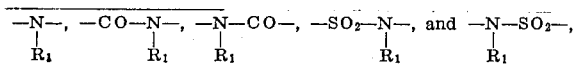

wherein $R_1$ is hydrogen or lower alkyl.

2. Photographic material in accordance with claim 1 which contains a dyestuff of the formula $A_2 - N=N-M_2 -X- (Y-Z)_{n-1} - D_2 - N=N-E_2$ in which $A_2$ and $E_2$ each possesses a 1-hydroxy-8-amino-naphthalene- 3,5 - or 3,6-disulphonic acid residue or a 2-amino-8-hydroxy-naphthalene- 6-sulphonic acid residue which contains on the nitrogen atom phenyl or substituted phenyl and $D_2$ is phenylene or phenylene substituted with chlorine, methyl, methoxy, sulphonic acid or carboxylic acid groups or a naphthalene disulphonic acid residue and in which X, Y, Z and n have the meaning as stated in claim 1.

3. Photographic material in accordance with claim 1 which contains a dyestuff of the formula

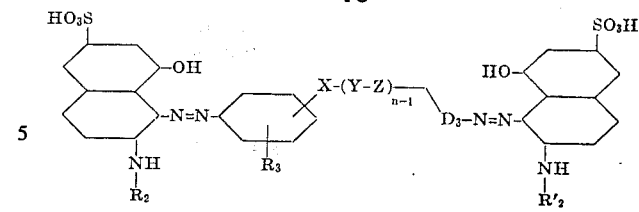

in which $R_2$ and $R'_2$ each stand for a hydrogen atom or a benzene residue substituted with a least one phenoxy, dialkylaminocarbonyl, dialkylaminosulphonyl, trifluoromethyl, sulphonic acid or carboxyl group or a halogen atom, $R_3$ stands for a hydrogen or a chlorine atom or for a sulphonic acid group and $D_3$ stands for a benzene radical residue which is unsubstituted or substituted with chlorine or sulphonic acid groups and which in the 3 or 4 position is bonded to the azo group of the other half of the dyestuff molecule or 2,6-naphthalene-4,8-disulphonic acid residue, the residual benzene to which $R_3$ is bonded, being bonded to the azo group in the 3 or 4 position and X, Y, Z and n having the meaning stated for them in claim 2.

4. Photographic material in accordance with claim 1 which contains a dyestuff of the formula

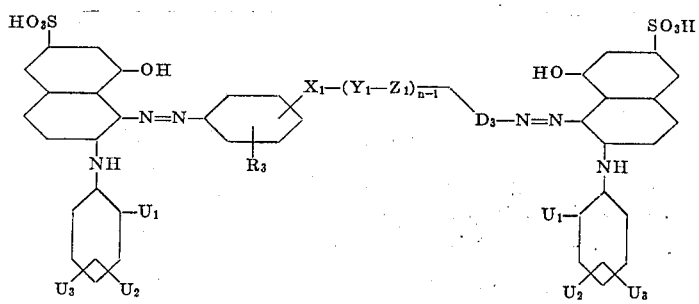

in which $U_1$ stands for a hydrogen atom, a methyl or methoxy group, $U_2$ for a hydrogen or halogen atom, a methyl, methoxy or phenoxy group, $U_3$ stands for a chlorine, bromine or fluorine atom, a methyl, methoxy, acetyl, trifluoromethyl, sulphomethyl, sulphonic acid, carboxylic acid, dimethylaminocarbonyl or sulphonyldiethylamide group, $Y_1$ stands for a benzene, diphenyl, diphenylsulphon or a residual benzene-dicarboxylic acid-di-(amidophenyl) containing sulphonic acid groups, $X_1$ stands for $-O-$, $-S-$, $-SO_2-$, $-CO-$ or $-NH-$ and $Z_1$ stands for $-O-$, $-S-$, $-CO-$, $-NH-CO-$ or $-CO-NH-$ and $R_3$, $D_3$ and $n$ have the meaning stated for them in claims 2 and 5.

5. Photographic material in accordance with claim 1, which contains a dyestuff of the formula

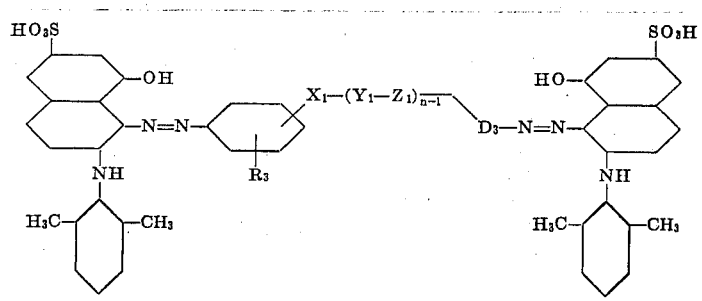

in which $R_3$, $D_3$, $n$, $X_1$, $Y_1$ and $Z_1$ have the meanings described in claims 2, 5 and 6.

6. Photographic material in accordance with claim 1 which contains a dyestuff of the formula

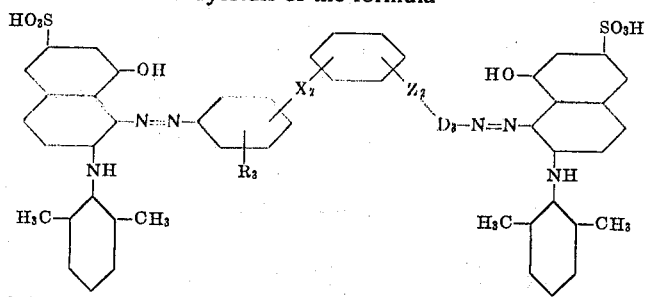

in which $X_2$ stands for —O—, —S—, —CO— or —SO$_2$— and $Z_2$ stands for —O— or —CO—NH— and $R_3$ and $D_3$ have the meaning ascribed to them in claim 5.

7. Photographic material as claimed in claim 1, which contains a dyestuff selected from the group consisting of the azo dyestuffs of the formulae

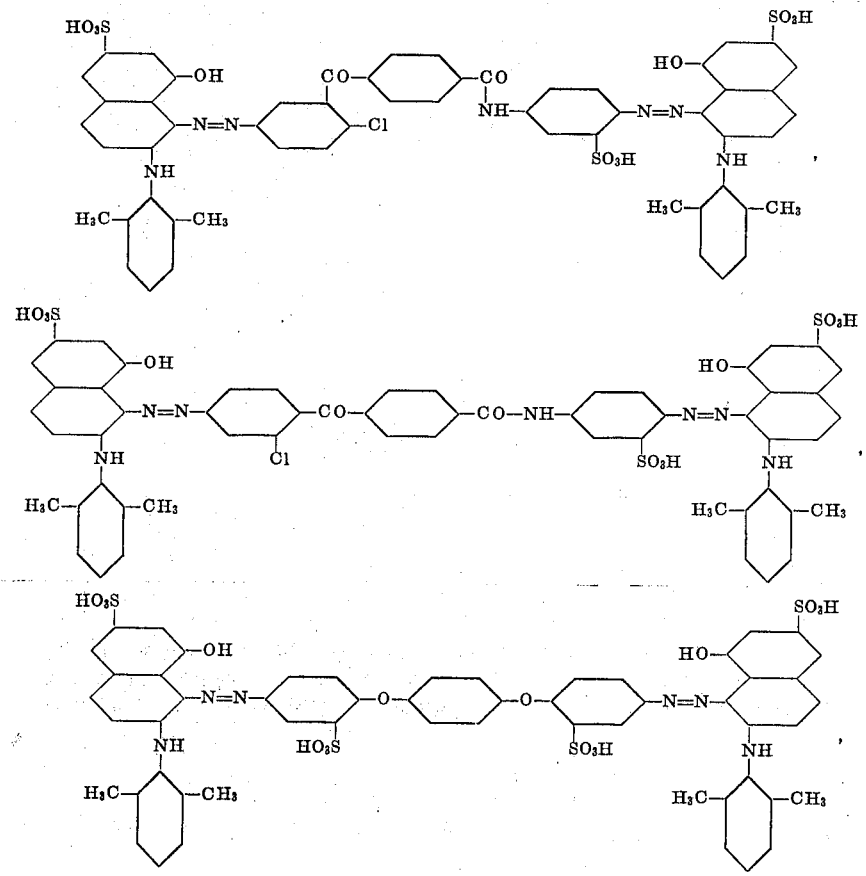

and

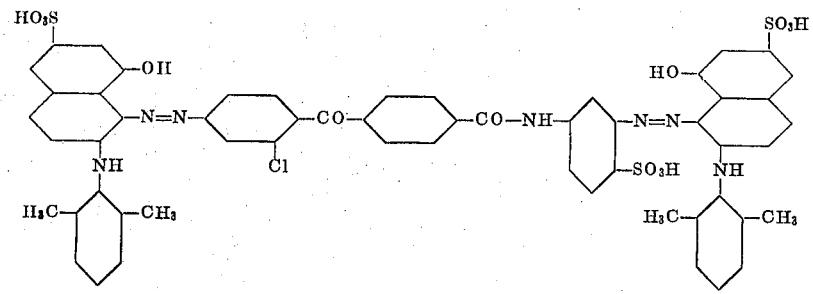

8. A photographic light-sensitive material which contains on a support at least one silver halide layer and at least one azo dyestuff of formula $$A-N=N-M-X-(Y-Z)_{n-1}-Q$$

in which
A has the formula

[structures shown]

where
$p$ is 1 or 2
$R_2$ is hydrogen or phenyl substituted by one or more of phenoxy, dialkylaminocarbonyl, dialkylaminosulphonyl, trifluoromethyl, sulfonic acid, carboxylic acid, halogen, lower alkyl, lower alkoxy, lower alkanoyl, sulpholoweralkyl R' is hydrogen or benzoyl carboxylic M is phenylene that is unsubstituted or substituted by halogen, lower alkyl, lower alkoxy, SO$_3$H, sulfonic acid amide, carboxylic acid or carobxylic acid amide, X is —O—, —S—, —SO—, —SO$_2$—, —CO—,

wherein R is hydrogen or lower alkyl

Y is

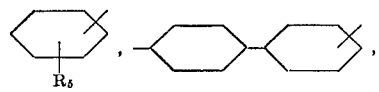

or

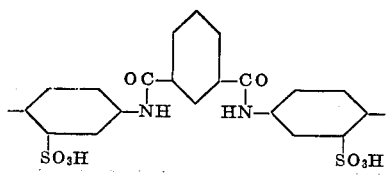

where

R$_5$ is hydrogen or SO$_3$H

Z is —O—, —S—, —SO—, —SO$_2$—, —CO—,

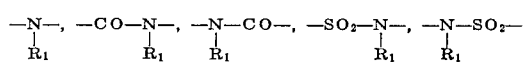

where

R$_1$ is hydrogen or lower alkyl $n$ is 1 or 2

Q is alkyl of 1–18 carbon atoms phenyl which is unsubstituted or substituted by halogen, lower alkyl, lower alkoxy nitro, alkylcarbonyl, acylamino or sulfonic acid, pyridinyl, thiophenyl or furanyl or Q is a group of formula $$-D-N=N-A$$

in which D is phenylene that is unsubstituted or substituted by halogen, lower alkyl, lower alkoxy, sulphonic acid, sulphonic acid amide, carboxylic acid or carboxylic acid amide, or D is naphthylene containing 1 or 2 sulphonic acid groups.

* * * * *